US012608537B2

(12) United States Patent
Dixit et al.

(10) Patent No.: US 12,608,537 B2
(45) Date of Patent: Apr. 21, 2026

(54) DATA EXTRACTION SERVICE

(71) Applicant: Target Brands, Inc., Minneapolis, MN (US)

(72) Inventors: Neha Dixit, Bengaluru (IN); Nishtha Gupta, Bengaluru (IN); Vidya Hungud, Bengaluru (IN); Ashok J, Bengaluru (IN); Mohammed Jafer, Bengaluru (IN); Arun Patil, Bengaluru (IN); Suresh Saini, Bengaluru (IN); Debraj Singha, Bengaluru (IN)

(73) Assignee: Target Brands, Inc., Minneapolis, MN (US)

( * ) Notice: Subject to any disclaimer, the term of this patent is extended or adjusted under 35 U.S.C. 154(b) by 306 days.

(21) Appl. No.: 18/475,833

(22) Filed: Sep. 27, 2023

(65) Prior Publication Data

US 2025/0103798 A1 Mar. 27, 2025

(51) Int. Cl.
*G06F 3/048* (2013.01)
*G06F 40/177* (2020.01)
*G06V 30/18* (2022.01)
*G06V 30/412* (2022.01)
*G06V 30/413* (2022.01)

(52) U.S. Cl.
CPC ...... *G06F 40/177* (2020.01); *G06V 30/18038* (2022.01); *G06V 30/412* (2022.01); *G06V 30/413* (2022.01)

(58) Field of Classification Search
CPC ................ G06F 40/177; G06V 30/413; G06V 30/18038; G06V 30/412
See application file for complete search history.

(56) References Cited

U.S. PATENT DOCUMENTS 9,449,312 B1 * 9/2016 Wilson ................. G06Q 20/202
10,366,123 B1 7/2019 Madhani et al.
11,450,125 B2 9/2022 Schafer et al.
11,475,686 B2 10/2022 Erdemir et al.
11,789,990 B1 * 10/2023 Fouad ..................... G06F 16/35 707/736
12,387,512 B1 * 8/2025 Sureka ................... G06V 20/70
12,437,569 B1 * 10/2025 Rangarajan .......... G06V 30/413
2018/0101725 A1 * 4/2018 Schmidt ................ G06F 16/334
2019/0188465 A1 * 6/2019 Tripuraneni ......... G06V 30/416
2020/0097759 A1 * 3/2020 Nadim ................... G06N 20/00
2021/0150338 A1 5/2021 Semenov
2021/0240932 A1 8/2021 Erdemir et al.
(Continued)

OTHER PUBLICATIONS

Holecek et al., Table Understanding in Structured Documents (Jul. 9, 2019).
Xu et al., Layout LM: Pre-training of Text and Layout for Document Image Understanding, arXiv (Jun. 16, 2020).
Dong et al., TableSense: Spreadsheet Table Detection with Convolutional Neural Networks, arXiv (Jun. 25, 2021).
(Continued)

*Primary Examiner* — David Phantana-angkool
(74) *Attorney, Agent, or Firm* — Merchant & Gould P.C.

(57) ABSTRACT

A data extraction service is disclosed. The data extraction service may receive an image that includes a data table. The data extraction service may perform optical character recognition on the image. The data extraction service may label text in the image to identify the table. The data extraction service may generate a digital data table corresponding to the data table in the image. The data extraction service may format the digital data table and provide the formatted digital data table to a downstream entity.

20 Claims, 13 Drawing Sheets

| | ITEM | SIZE | UPC | UNIT | DISCOUNT | NET CASE |
|---|---|---|---|---|---|---|
| **0** | 9042546 | 5L | 85000016671 | 87 | 28.5 | 58.5 |
| **1** | 9089666 | 1.5L | 85000018132 | 87 | 28.5 | 58.5 |
| **2** | 9004297 | 3L | 81434000033 | 162 | 72.06 | 89.94 |
| **3** | 9150309 | 750ML | 85000020302 | 132 | 51 | 81 |
| **4** | 9064483 | 750ML | 85000017739 | 234 | 90 | 144 |

(56) References Cited

U.S. PATENT DOCUMENTS

| | | | | |
|---|---|---|---|---|
| 2021/0240976 | A1* | 8/2021 | Tiyyagura | G06V 30/414 |
| 2022/0358575 | A1* | 11/2022 | Smith | G06T 7/0008 |
| 2023/0004604 | A1* | 1/2023 | Li | G06N 5/048 |
| 2023/0121351 | A1* | 4/2023 | Becker | G06F 16/353<br>715/217 |
| 2023/0325373 | A1* | 10/2023 | Reese | G06V 30/413<br>707/741 |
| 2023/0385298 | A1* | 11/2023 | Razin | G06V 30/1444 |
| 2024/0160838 | A1* | 5/2024 | Anoun | G06V 30/416 |
| 2025/0103798 | A1* | 3/2025 | Dixit | G06V 30/412 |
| 2025/0225810 | A1* | 7/2025 | Wei | G06V 30/414 |
| 2025/0308274 | A1* | 10/2025 | Wei | G06V 30/1448 |
| 2025/0316102 | A1* | 10/2025 | Sureka | G06T 5/60 |
| 2025/0316106 | A1* | 10/2025 | Sureka | G06V 30/412 |
| 2025/0316109 | A1* | 10/2025 | Sureka | G06V 10/82 |

OTHER PUBLICATIONS

Subramani et al., A Survey of Deep Learning Approaches for OCR and Document Understanding, arXiv (Feb. 4, 2021).

Fine-Tuning LayoutLM v3 for Invoice Processing, Towards Data Science (Jul. 18, 2022).

Ha et al., Information Extraction from Scanned Invoice Images Using Text Analysis and Layout Features (Aug. 8, 2022).

Is Automated Invoice Handling with Machine Learning and OCR Really All That?, AFFINDA (Feb. 3, 2023).

Integrating Automated Invoice Processing OCR into your Business Instantly, WIDTHAI (Mar. 10, 2022).

AI-OCR for Invoice Processing: Automating Accounts and Payments, OODLES AI (Jun. 3, 2020), 6 Pages.

* cited by examiner

| ITEM | UPC | UPRICE | DISC | PRICE |
|---|---|---|---|---|
| 45200 | 1657195382 | 12.75 | 0 | 12 |
| 24011 | 1657195085 | 10 | 0 | 8.8 |
| 17107 | 1657191030 | 10 | 0 | 8.8 |
| 23600 | 1657195084 | 10 | 0 | 8.8 |
| 35950 | 1657195267 | 10 | 0 | 8.8 |
| 17104 | 1657191125 | 10 | 0 | 8.8 |
| 30899 | 1657195210 | 10 | 0 | 8.8 |
| 19023 | 1657194034 | 10 | 0 | 8.8 |
| 17103 | 1657191037 | 10 | 0 | 8.8 |
| 17646 | 1657194035 | 10 | 0 | 8.8 |
| 17100 | 1657191031 | 10 | 0 | 8.8 |
| 17102 | 1657191032 | 10 | 0 | 8.8 |
| 17647 | 1657194033 | 10 | 0 | 8.8 |
| 45197 | 1657195386 | 12.75 | 0 | 12 |
| 53154 | 1657195571 | 10 | 0 | 8.8 |
| 45198 | 1657195282 | 12.75 | 0 | 12 |
| 45201 | 1657195283 | 12.75 | 0 | 12 |

202

302

| | ITEM | SIZE | UPC | UNIT | DISCOUNT | NET CASE |
|---|---|---|---|---|---|---|
| **0** | 9042546 | 5L | 850000016671 | 87 | 28.5 | 58.5 |
| **1** | 9089666 | 1.5L | 850000018132 | 87 | 28.5 | 58.5 |
| **2** | 9004297 | 3L | 81434000033 | 162 | 72.06 | 89.94 |
| **3** | 9150309 | 750ML | 850000020302 | 132 | 51 | 81 |
| **4** | 9064483 | 750ML | 850000017739 | 234 | 90 | 144 |

700

Receive Image 702

↓

Correct Image 704

↓

Detect Text 706

↓

Recognize Text 708

↓

Label Text 710

↓

Identify Table 712

↓

Construct Digital Data Table 714

↓

Format Data 716

↓

Output Structured Data 718

DATA EXTRACTION SERVICE

BACKGROUND

Extracting data from an image is a difficult task for a computer. For example, the image may be low quality, contain unexpected objects, or be misaligned. Additionally, the format of data and the way in which data is presented in the image may vary from image to image, thereby limiting the utility of hard-coded templates. Furthermore, there are additional challenges when the task is to extract tabular data from an image. For example, it may be challenging for a computer program to recognize where a table is located in the image, and it may be difficult to accurately match table cells with the appropriate rows and columns, given the imperfections of images and the variability of data table formats across images.

Some approaches for extracting data from an image are limited. Some approaches may be inaccurate when extracting data with certain characteristics, such as decimal points and single-character words which may be difficult to determine accurately, e.g., due to limited context. Some approaches may be configured to extract format-specific data from images. Some approaches may only extract certain data fields from an image. In the context of extracting tabular data, some approaches inaccurately interpret the relationships between table cells, columns, and rows. Furthermore, manually converting data from an image to a digital form may be a time-consuming and error-prone activity, and therefore may be unusable in the case where a large number of images are to be analyzed.

SUMMARY

Aspects of the present disclosure relate to a data extraction service. The data extraction service may receive an image that depicts a data table. The data extraction service may construct a digital data table that corresponds with the data table depicted in the image. To do so, the data extraction service may, in some embodiments, perform optical character recognition on the image and may locate the data table in the image.

In a first aspect, a method for extracting data from an image is disclosed. The method comprises receiving the image, the image depicting a data table; perform optical character recognition on the image to detect a plurality of bounding boxes and to determine one or more characters associated with each bounding box of the plurality of bounding boxes, wherein performing optical character recognition comprises applying a plurality of machine learning models; labeling, using a multi-modal machine learning model trained to perform a classification task, a first bounding box of the plurality of bounding boxes as a column header and a second bounding box of the plurality of bounding boxes as including tabular data; and constructing, based at least in part on the labels of the first bounding box and the second bounding box, a digital data table corresponding to the data table.

In a second aspect, a data extraction service is disclosed. The data extraction service comprises a processor; and memory storing instructions that, when executed by the processor, causes the data extraction service to: receive an image depicting a data table; perform optical character recognition on the image to detect a plurality of bounding boxes and to determine one or more characters associated with each bounding box of the plurality of bounding boxes, wherein performing optical character recognition comprises applying a plurality of machine learning models; label, using a multi-modal machine learning model trained to perform a classification task, a first bounding box of the plurality of bounding boxes as including a column header and a second bounding box of the plurality of bounding boxes as including tabular data; and construct, based at least in part on the labels of the first bounding box and the second bounding box, a digital data table corresponding to the data table.

In a third aspect, a system for converting a data table into a digital data table is disclosed. The system comprises a device; a downstream entity; and a data extraction service communicatively coupled to the device and the downstream entity; wherein the data extraction service is configured to: receive an image from the device, the image depicting the data table; perform optical character recognition on the image to detect a plurality of bounding boxes and to determine one or more characters associated with each bounding box of the plurality of bounding boxes, wherein performing optical character recognition comprises applying a plurality of machine learning models; label, using a multi-modal machine learning model trained to perform a classification task, a first bounding box of the plurality of bounding boxes as a column header and a second bounding box of the plurality of bounding boxes as including tabular data; construct, based at least in part on the labels of the first bounding box and the second bounding box, the digital data table corresponding to the data table; and provide the digital data table to the downstream entity.

DETAILED DESCRIPTION

Figure 1:
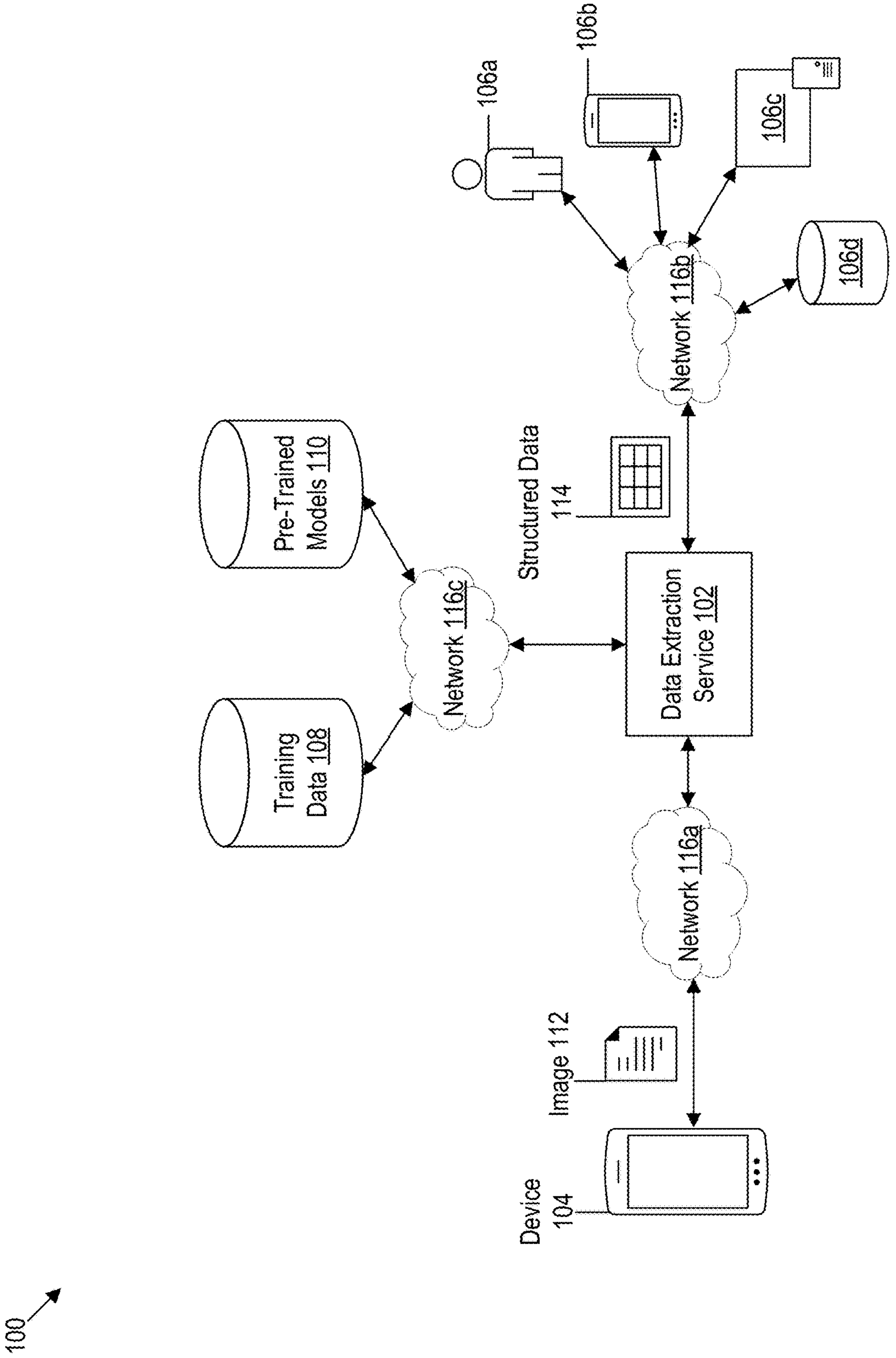
FIG. 1 illustrates an example network environment in which aspects of the present disclosure may be implemented.

As briefly described above, aspects of the present disclosure relate to a service that extracts structured data, such as tabular data, from an image. For example, the service may receive an image of an invoice, where the image depicts a data table including invoice data. The service may locate the data table, generate a digital data table, and format the digital data table into a data object for use in a downstream process. The data extraction service may include various components, such as an optical character recognition ("OCR") service, a labeling model, and a table extractor.

In example aspects, the OCR service may use multiple machine learning models. Together, the models may perform text detection and text recognition. For text detection, the OCR service may use an ensemble of machine learning models having different architectures. In some embodiments, the ensemble may include one model that better detects single characters and symbols and another model that better detects multi-character strings. Additionally, the ensemble may include one model trained from scratch and another that is pre-trained and then fine-tuned for tabular data extraction. For text recognition, the OCR service may use another machine learning model. The recognition model may receive bounding boxes from the detection models and infer characters in the bounding boxes.

In example aspects, the data extraction service may also include a labeling model, which may be another machine learning model. Features of the labeling model may include embeddings of the image, the bounding box coordinates, and the characters in the bounding boxes. The labeling model may perform a multi-class classification task, inferring whether objects in the image (e.g., words) are a table column header, table data, or other type of data. As a result, the data extraction service may determine where structured table data is located in the image, which characters are column headers, and which characters are tabular data.

In example aspects, having labeled objects in the image, the data extraction service may perform a process for creating a digital representation of the table. For example, based on the characters labeled as columns, and these characters' coordinates, the process may determine a list of columns and align the columns. Next, the process may, based on the alignment of columns and the relative positions of table data, match table data cells with rows and columns, thereby constructing a digital version of the table. In some instances, the process may properly construct the table even if the image is rotated or curved, or if the data in the image lacks lines or has irregular spacing. In some embodiments, the data extraction service may also clean, correct, and format the digital table for downstream use.

As an example use of the data extraction service, a device may capture an image that includes structured data—such as an image of an invoice—and provide that image to the data extraction service. The data extraction service, using the components briefly described above and further described below, may automatically extract and format the structured data. The data extraction service may then provide the structured data to downstream users, such as workers who are responsible for receiving a shipment of goods associated with the invoice, an accounts payable system, a system for verifying that an invoiced price corresponds to a negotiated price, an inventory management system, a vendor system, or to other systems.

Aspects of the present disclosure provide various technical advantages. For example, the data extraction service may extract data independently of the format, structure, and origin of the data. Thus, not only are time and costs saved by reducing the need to manually extract data from images, but time and costs are further reduced by reducing the need to create and maintain format-specific templates for data extraction. Furthermore, images having structured data, such as invoices, are processed more quickly, work time is saved, and errors associated with processing invoices are reduced, thereby improving the accuracy and speed of tasks that use such structured data.

Yet still, aspects of the present disclosure may perform particularly well in the context of detecting and recognizing symbols and characters found in tabular data, such as decimal points, abbreviations, special characters, and single characters, given the training, implementation, and combination of various machine learning models. Yet still, certain models of the data extraction service may be pre-trained on large amounts of data and fine-tuned for use in the data extraction service, thereby leveraging the understanding of large-scale models that require significant computing time and resources to train, while also accounting for particularities of detecting, recognizing, and extracting tabular data within the context, in some instance, of invoices. Furthermore, certain models of the data extraction service may use embeddings associated with an image, inferred characters, and inferred character locations to locate and label tabular data, thereby improving the accuracy and precision of recognizing and extracting data.

FIG. 1 illustrates a network environment 100 in which aspects of the present disclosure may be implemented. The environment 100 includes a data extraction service 102, a device 104, downstream entities 106*a-d*, and databases 108-110. In the example shown, the network 116*a* communicatively couples the device 104 and the data extraction service 102, the network 116*b* communicatively couples the data extraction service 102 with the downstream entities 106*a-d*, and the network 116*c* communicatively couples the databases 108-110 with the data extraction service 102. In some embodiments, one or more of the components in the example environment 100 may be associated with a common entity. For instance, the device 104 may be associated with a worker of an organization, the data extraction service 102 may be created or operated by the organization, and one or more of the downstream entities 106*a-d* may be associated with the organization.

The data extraction service 102 may receive an image (e.g., the image 112) and extract structured data (e.g., the structured data 114) from the image. Example uses of the data extraction service 102 are illustrated and described below in connection with FIGS. 2-3. The data extraction service 102 may include a plurality of components that perform various processes within the data extraction service 102. For example, the data extraction service 102 may include a system for cleaning an image, performing optical character recognition (OCR), identifying a table, constructing a digital data table, and formatting the digital data table. In some embodiments, the data extraction service 102 is hosted on a cloud or multi-cloud platform. In some embodiments, the data extraction service 102 may expose an API that programs may call to extract structured data from an image. In some instances, the data extraction service 102 may communicate with other services or entities using Apache Kafka. Components of the data extraction service 102 and an example architecture of the data extraction service 102 are illustrated and described below in connection with FIG. 4.

The device 104 may provide the image 112 to the data extraction service 102. In some embodiments, the device 104 is a device that can capture images (e.g., a document capture device), such as a camera, a mobile phone having a camera, a scanner, or another device that may capture an image. In some embodiments, the device 104 is a computer that generates the image 112 or receives the image 112 from another system. Although illustrated as one device in the example of FIG. 1, there may be a plurality of devices that provide images to the data extraction service 102, and two or more of the devices may be a different type of device.

The image 112 may be an image that includes data, such as a data table. Additionally, in some instances, the image 112 may include other information, such as data for one or more entities associated with the data. In the retail context, for example, the image 112 may include vendor information, recipient information, distributor information, location information, dates and times, product data (e.g., prices, quantities, identifiers), regulatory information, or other data. As shown, the device 104 may provide the image 112 to the data extraction service 102 for the data extraction service 102 to create a structured data object corresponding with the data captured by the image 112. In examples, the image 112 may be an image of a physical object, such as an invoice, receipt, paper, or other objects. In some instances, however, the image 112 may be a computer-generated image, such as a computer-generated invoice, receipt, or visual representation of data. The file format of the image 112 may be any file format that may represent visual data. As non-limiting examples, the file format may be JPEG, PNG, PDF, DOC, DOCX or GIF. In some embodiments, the image 112 may include metadata related to when the image was created, the entity that created the image, attributes of the image or the content in the image, or data related to the image. In some embodiments, the image 112 may also be a plurality of images. For example, a single data table may span across multiple images. Conversely, one image may include multiple data tables. As another example, the device 104 may provide images for different data to the data extraction service 102 (e.g., the device 104 may provide a first image having a first data table to the data extraction service 102 and a second image having a second data table).

The downstream entities 106*a-d* may receive structured data 114 from the data extraction service 102. There may be various types of entities 106*a-d*. For example, the user 106*a* may be a person that receives the structured data 114. In some embodiments, the person 106*a* may review the structured data 114 and edit the structured data 114 to correct any errors, thereby creating a labeled training instance that can be used to improve models of the data extraction service 102, a process that is further described below in connection with FIG. 12. Furthermore, the user 106*a* may be a worker of an entity associated with the device 104 or the data extraction service 102. In some instances, if the image 112 is an image of an invoice, then the user 106*a* may be a worker that is responsible for receiving or checking a shipment associated with the invoice. In an example, the worker may compare the digital data table received from the data extraction service 102 with the corresponding shipment of goods.

The device 106*b* may be a mobile device with a mobile application that ingests the structured data 114. For instance, structured data 114 may be pushed to a plurality of users (e.g., workers) via a mobile application running on devices such as the device 106*b*. In some embodiments, the device 106*b* may be the device 104 (e.g., the data extraction service 102 may provide the structured data 114 to the device that sent the image 112). The system 106*c* may ingest the structured data 114 for analysis or for business purposes. For example, the system 106*c* may be a system for managing accounts payable, vendor interactions, inventory, or another operation. In some embodiments, the system 106*c* may automatically compare data of the digital data table for an invoice to a shipment of goods associated with the invoice. They system 106*c* may, for example, automatically verify that a price, quantity, or item type listed in the digital data table corresponds with an actual shipment of goods received or sent. The database 106*d* may be a database that is external to the data extraction service 102. In some embodiments, the data extraction service 102 may push the structured data 114 to a Kafka Topic, from which it may be read by one or more of the entities 106*a-d*. Depending on the embodiment, there may be overlap between the entities 106*a-d*, and there may be more or fewer entities that consume the structured data 114 than those shown.

The structured data 114 may be a digital data table of data in the image 112. Thus, the data represented by the structured data 114 may depend on the data in the image 112. Accordingly, if the image 112 includes a data table with rows and columns, then the structured data 114 may be a digital representation of the data table data having rows and columns. Additionally, if the image 112 includes data having a different structure (e.g., in an array or other structure), then the data in the structured data 114 may represent data having that structure. Similarly, the data fields (e.g., column headers or titles) in the structured data 114 may depend on the data fields of the data in the image 112. In the retail context, for example, the data fields may include, but need not include and are not limited to, the following: item number, unique item identifier, size, number of units, discount, price, category, and department. In some embodiments, the data extraction service 102 may require that one or more data fields be present. In some embodiments, the structured data 114 can have different forms. In some embodiments, the structured data 114 is a JSON or DataFrame object. In some embodiments, the structured data 114 is an XML, XLS, CSV, ODS, or other format. In some embodiments, the structured data 114 may be 2-dimensional array, the format of which may depend on the programming language of a program that ingests the structured data 114.

The training data 108 may be data that is used by the data extraction service 102 to train one or more machine learning models. In some embodiments, the training data may include one or more open-source or public datasets. The public training data 108 may include the FUNSD (Form Understanding in Noisy Scanned Documents) or FUNSD+ dataset. In some embodiments, the training data 108 may include one or more private datasets. In some embodiments, the training data 108 may include synthetic training data. Example training data is further described below in connection with FIG. 6.

The pre-trained models 110 may be pre-trained machine learning models that are used by the data extraction service 102. In some embodiments, the pre-trained models may be publicly available. In some embodiments, the pre-trained models may be open-source models. The pre-trained models 110 may be trained for different tasks. In some embodiments, one or more of the pre-trained models 110 may be a generalized model. In some examples, the pre-trained models include CRAFT (Character-Region Awareness for Text detection) and LayoutLM.

Each of the networks 116*a-c* may be, for example, a wireless network, a wired network, a virtual network, the internet, or another type of network. Furthermore, each of the networks 116*a-c* may be divided into subnetworks, and the subnetworks may be different types of networks or the same type of network. In different embodiments, the network environment 100 can include a different network configuration than shown in FIG. 1, and the network environment 100 may include more or fewer components than those illustrated.

Figure 2:
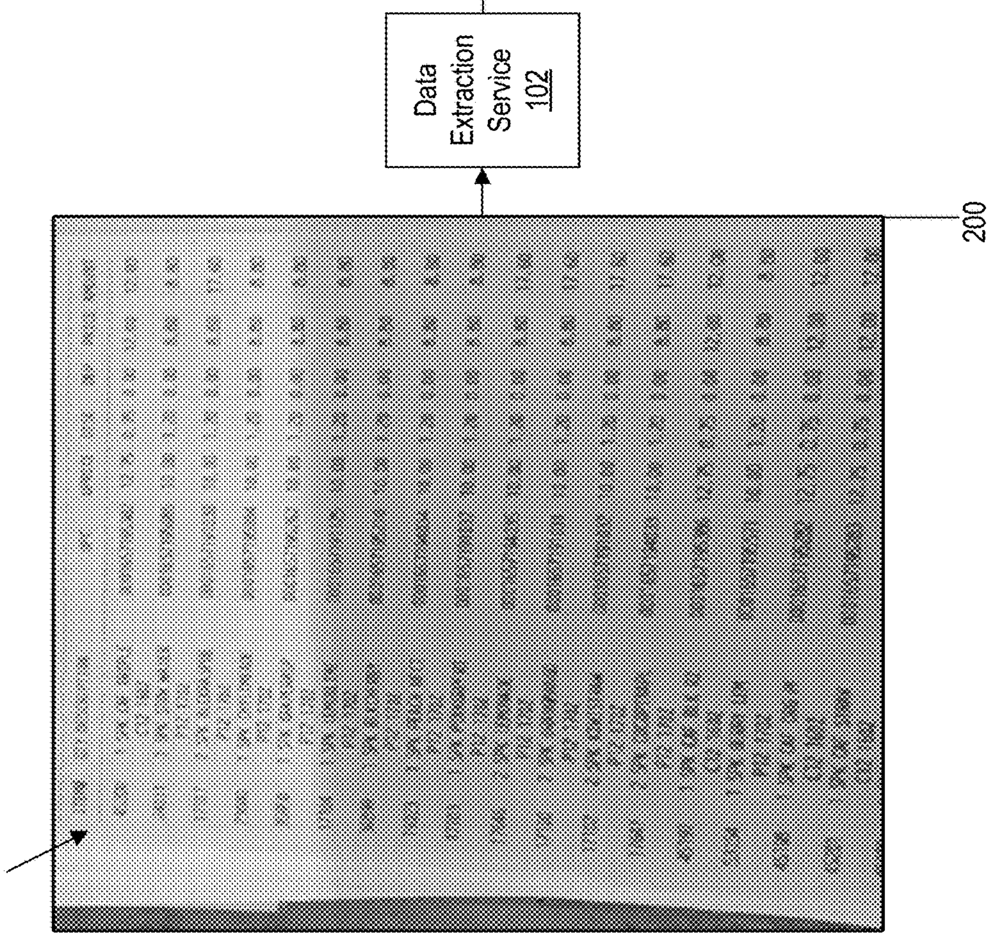
FIG. 2 illustrates an example operation of the data extraction service.
Figure 3:
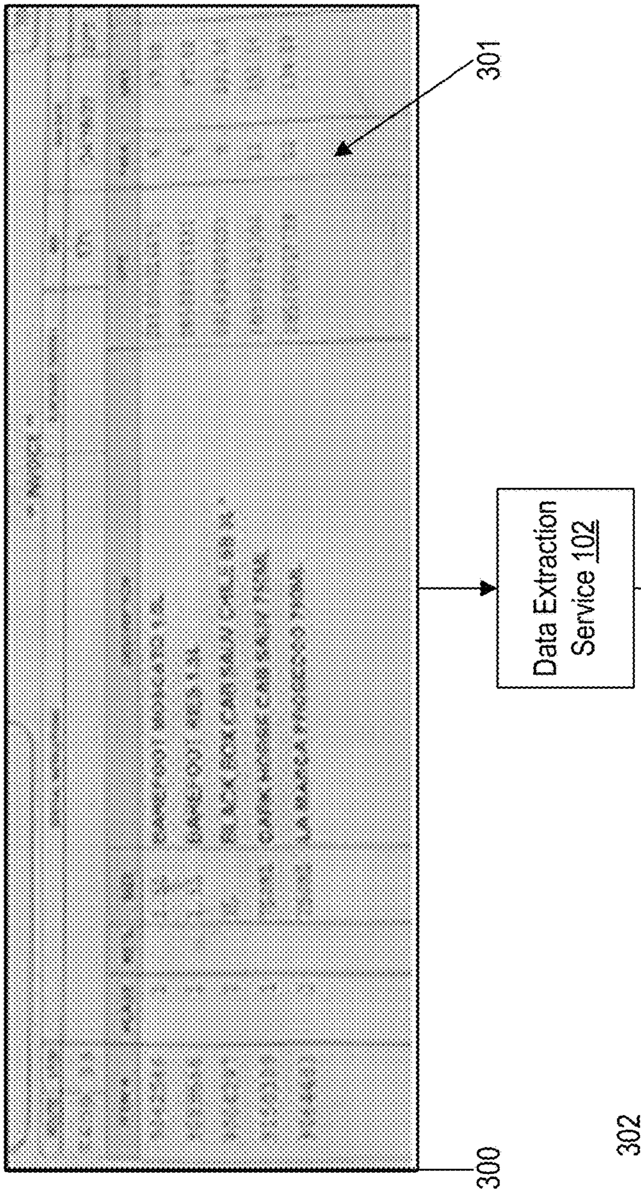
FIG. 3 illustrates an example operation of the data extraction service.

FIGS. 2-3 illustrate schematic example uses of the data extraction service 102. The examples of FIGS. 2-3 may not be associated with a common entity and may not be temporally linked to one another; instead, the examples in FIGS.

2-3 merely provide illustrations of aspects of example uses by an embodiment of the data extraction service 102.

In the examples shown, the data extraction service 102 receives images, which include captures of invoice. For example, the image 200 includes the invoice 201, and the image 300 includes the invoice 301. In some embodiments, a document capture device (e.g., phone having a camera) may have taken a picture of the invoices and provided the images to the data extraction service 102 to extract a digital representation of the invoices. As shown, the images have characteristics that may, in some instances, complicate extraction of data of the invoices. For example, one or more of the invoices is not properly centered, is rotated and curved, is blurry, has markings, has data that is not part of a data table, or has shading that is dark and inconsistent. Yet still, one or more of the invoices does not include lines between all data cells, has inconsistent spacing of data (both within data cells and between data cells), has inconsistent type font and style, and includes special characters, such as decimal points or abbreviations.

Nevertheless, in the example shown, the data extraction service 102 may, for example, recognize the characters and locations of the data in the invoices, detect the location and layout of the invoice tables, and construct structured digital data that represents data of the invoices. For example, the data extraction service 102 may generate the structured data 202 from the image 200 and the structured data 302 from the image 300. As shown in the examples of FIGS. 2-3, the structured data generated by the data extraction service 102 may include less than all of the invoice data. For example, in the examples shown, the structured data do not include a "Description" field, although such a field is in the invoices. In some embodiments, the data extraction service 102 may extract all the invoice data but may use less than all data fields as part of constructing the structured data. In some embodiments, the structured data may include all the data in the invoice. Yet still, in some embodiments, the data extraction service 102 may add data to the structured digital data, such as the indices 0-4 illustrated in connection with structured data 202 and 302.

In the example of FIG. 2, the image 200 may be an example of the image 112 of FIG. 1. As shown, the image 200 includes data in the form of a table, but the data table is rotated and curved, and there is a shade that covers part of the table. Furthermore, the columns and rows are not evenly spaced, and there are no borders or other graphical separators apparent in the image 200 to structure the table. Yet still, there may be no clear indication regarding where the table starts and stops (e.g., no outer border, or the like). The data extraction service 102 may receive the image 200 and extract structured data, such as the structured data 202, which may be an example of the structured data 114 of FIG. 1. As shown, the data of the structured data 202 represents the data in the image 200.

In the example of FIG. 3, the image 300 may be an example of the image 112 of FIG. 1. As shown, the image 300 is blurry, skewed, includes different background shades and shades of text, includes extraneous marks, includes empty data cells, and includes information that is not part of the data table. In the example shown, the data extraction service 102 may receive the image 300 and extract the data table. The data extraction service 102 may generate the structured data 302, which may be an example of the structured data 114.

Figure 4:
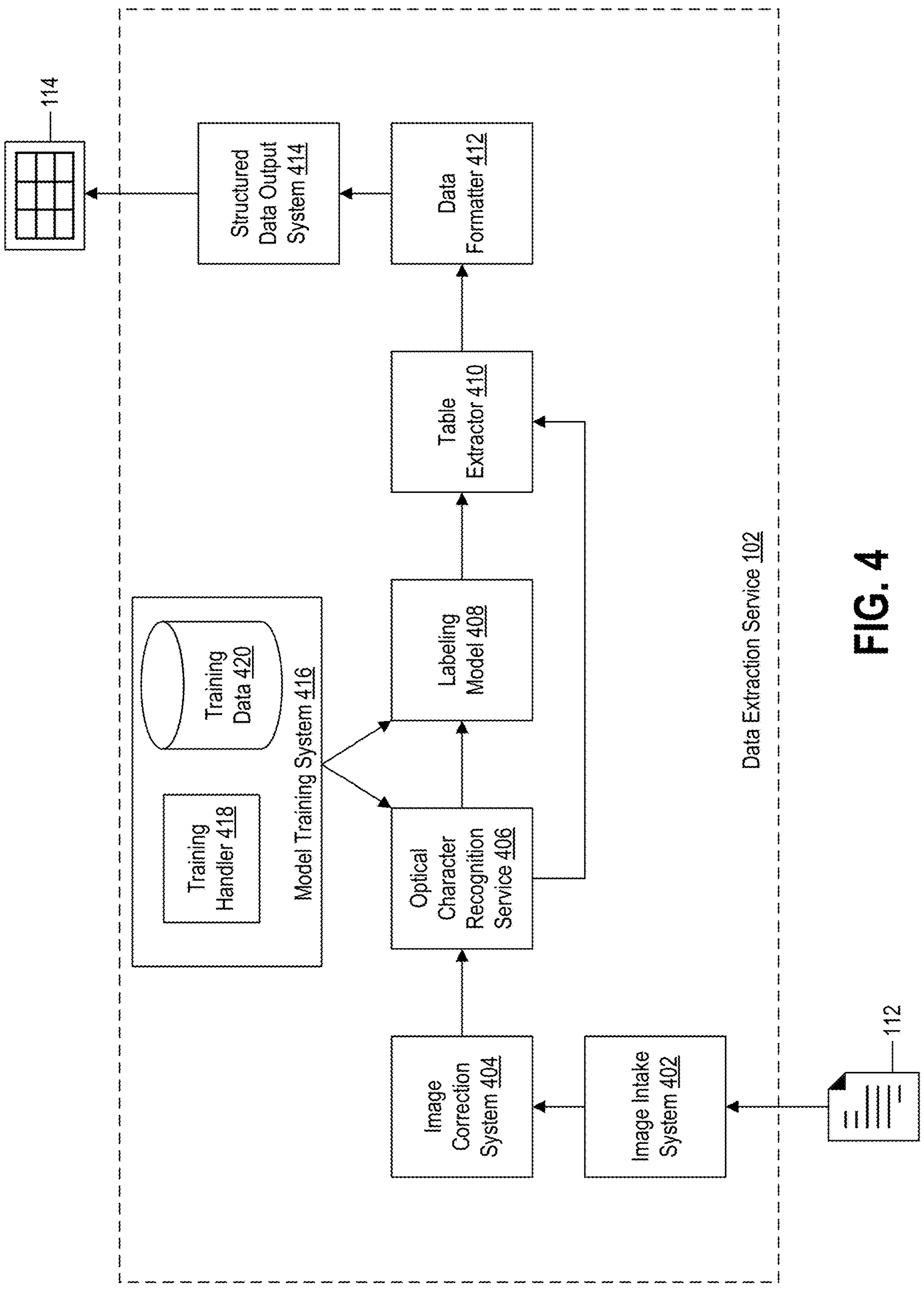
FIG. 4 illustrates a block diagram of an example architecture of the data extraction service.

FIG. 4 illustrates a block diagram of an example architecture of the data extraction service 102. In the example shown, the data extraction service 102 includes an image intake system 402, an image correction system 404, an optical character recognition service 406, a labeling model 408, a table extractor 410, a data formatter 412, a structured data output system 414, and a model training system 416. In examples, the components of the data extraction service 102 may be hardware, software, or a combination of software and hardware. In the example shown, an example flow of data is shown by the arrows between components. However, the data extraction service 102 is not limited to the components or the coupling of components illustrated in the example of FIG. 4. Although components of the data extraction service 102 are described as performing certain functions or operations, such functions and operations may be performed by other components of the data extraction service 102, and functionality of components of the data extraction service 102 may overlap and depend on the embodiment.

The image intake system 402 may, in some embodiments, receive the image 112. In some embodiments, the image intake system 402 may be coupled to an API that is exposed by the data extractions service 102 and called by a program that provides the image 112 to the data extraction service 102 to extract structured data. In some embodiments, the image intake system 402 may perform one or more other functions (e.g., logging operations, authorization or security operations, etc.). In examples, the image intake system 402 may provide the received image 112 to the image correction system 404.

The image correction system 404 may, in some embodiments, perform one or more operations related to changing characteristics of the image 112 to improve the performance of data extraction. In some embodiments, the image correction system 404 may include a plurality of subcomponents, each of which may be configured to detect and remedy an image flaw. In examples, the image correction system 404 may perform pre-processing operations on the image 112. In some embodiments, the image correction system 404 may perform one or more of the following operations on the image: deskewing, dewarping, despeckling, binarization, correcting light or shading, changing the image from horizontal to vertical or vice-versa, or performing another operation on the image. In some embodiments, the image correction system 404 may use a Docanalytics service or pipeline to perform one or more preprocessing tasks.

The optical character recognition service 406 may receive an image from the image correction system 404 and perform an optical character recognition process on the image, thereby recognizing characters and words in the image. The optical character recognition service 406 may output a plurality of bounding boxes to the labeling model 408 and the table extractor 410. Each of the bounding boxes may include or otherwise be associated with a value determined by the optical character recognition service 406. The value may be the text in the image at the location described by the bounding box's coordinates. In examples, the value may be a string, which may be one or more alphanumeric characters or other symbols or marks. Each of the bounding boxes may include a set of coordinates that describe the location of the bounding box on the image. In some embodiments, the optical character recognition service 406 may include a plurality of components, including an ensemble of machine learning models, used to perform optical character recognition. An example of the components and architecture of the optical character recognition service 406 is illustrated and described below in connection with FIG. 5.

The labeling model 408 may receive the image (e.g., the image corrected by the image correction system 404) and the plurality of bounding boxes, including their coordinates and associated values. In some embodiments, the labeling model 408 may label one or more of the bounding boxes. In some embodiments, the labeling model 408 may be a multi-modal machine learning model. For example, the labeling model 408 may include both textual and visual features. In some embodiments, the labeling model 408 may a be machine learning model trained to perform a multi-label classification task, where the classification task includes assigning one of a plurality of labels to a bounding box. The labels may include a label for a column header of a data table and a label for table data. In examples, the machine learning model may be a multi-modal vision language model that is trained to infer a label based on embeddings for bounding box coordinates, bounding box text, and other aspects of an image. In some embodiments, the labeling model is based on LayoutLM. In some embodiments, the labeling model 408 provides the bounding box labels to the table extractor 410. An example of an invoice with bounding boxes labeled by the labeling model 408 is illustrated and described in connection with FIG. 8.

The table extractor 410 may construct the data table. For example, the table extractor 410 may determine table columns, determine table rows, and make corrections to the data table. In some embodiments, the table extractor may use the coordinates of the bounding boxes determined by the optical character recognition service 406 and the labels of the bounding boxes determined by the labeling model 408. For example, the table extractor 410 may select as table columns the bounding boxes labeled as column headers by the labeling model 408, and the table extractor 410 may determine the values within columns by using the relative spacing—which may be determined based on bounding box coordinates—of bounding boxes that are labeled as table data. An example operation of the table extractor 410 is illustrated and described below in connection with FIG. 9.

The data formatter 412 may receive values for a digital data table from the table extractor 410, and the data formatter 412 may format the digital data table into a format for downstream use. In some embodiments, the data formatter 412 may format the data table into a different format depending on the downstream task for which the data is used. In some embodiments, the data formatter 412 may format the digital data table as a JSON or DataFrame object.

The structured data output system 414 may output the structured data 114 to a downstream system. In some embodiments, the structured data output system 414 may publish the structured data 114 to a Kafka Topic that is read by one or more downstream entities.

Continuing with the example of FIG. 4, the data extraction service 102 may also include a model training system 416. In some embodiments, the model training system 416 may train one or more of the labeling model 408 or one or more of the models of the optical character recognition service 406. In some embodiments, the model training system 416 may train the labeling model 408 or models of the optical character recognition service 406 prior to the data extraction service 102 being used to extract structured digital data.

In the example shown, the model training system includes a training handler 418 and training data 420. The training handler 418 may manage the training or fine-tuning of one or more models of the optical character recognition service 406 or the labeling model 408. In some embodiments, the training handler 418 may use the training data 420 or other training data. In some embodiments, the training handler 418 uses different training data for different models. In some embodiments, the training handler 418 may iteratively train a model of the character recognition service 406 or the labeling model 408, a process that is described below in connection with the example of FIG. 10. In some embodiments, the training handler 418 may monitor a performance of one or more models. For example, if the performance of the data extraction service 102 lowers for a particular set of images (e.g., the precision or recall drops for the set of images), then the training handler 418 may determine which, if any, of the machine learning model is not performing well for that set of images. In response to detecting that a model is not performing well, the training handler 418 may improve the model's performance for the set of images by training it on similar images. In some embodiments, the training handler 418 may, in response to detecting that a model is not performing well, adjust a threshold value used by the model or adjust a hyperparameter used by the model during training or inference. Thus, in some embodiments, the models of the data extraction service 102 may be individually configured so that, as a complete pipeline, the data extraction service 102 may accurately and precisely extract data.

The training data 420 may include various types of data. For example, the training data 420 may include labeled and unlabeled data, and the training data 420 may include data for different models or tasks. In some embodiments, the training data 420 may include synthetically generated data, imported public data (e.g., data from the training data 108), a private data set, annotated invoices, or other data. The training data 420 and the data that may be included in the training data 420 is described below in connection with FIG. 6.

Figure 5:
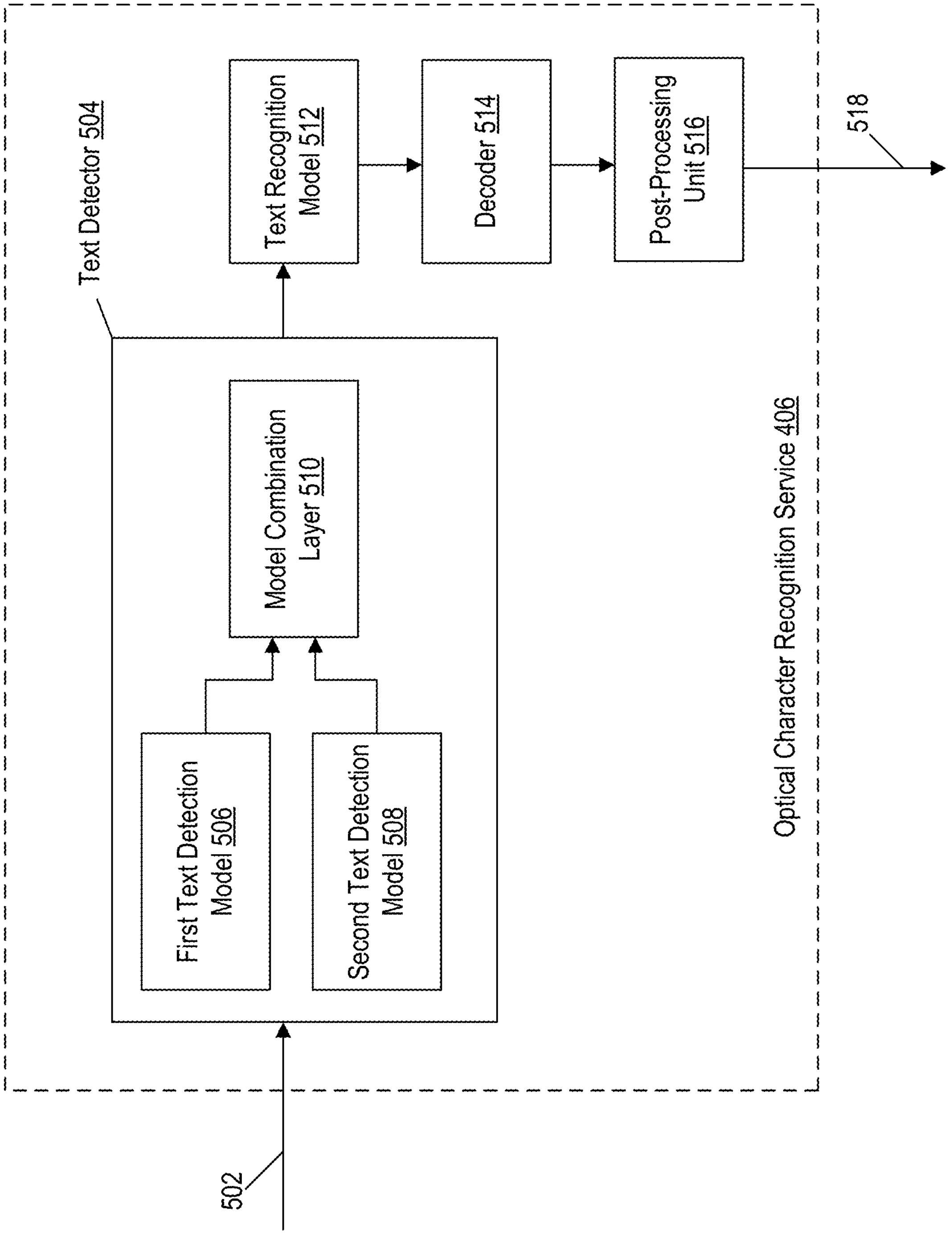
FIG. 5 illustrates a block diagram of an example architecture of an optical character recognition service.

FIG. 5 illustrates a schematic block diagram of an architecture of an example optical character recognition service 406 of FIG. 4. In the example shown, the optical character recognition service 406 includes a text detector 504 that includes a first text detection model 506, a second text detection model 508, and a model combination layer 510. The optical character recognition service 406 further includes a text recognition model 512, a decoder 514, and a post-processing unit 516. FIG. 5 illustrates an example data flow of an operation of the optical character recognition service 406.

In the example shown, the optical character recognition service 406 may receive an input 502. In some embodiments, the input 502 may be an image of data. In some embodiments, the image may have been pre-processed by an image correction system, such as the image correction system 404 of FIG. 4. In some embodiments, the optical character recognition service 406 may also include a pre-processing unit to perform one or more operations on the image to prepare it for optical character recognition.

The text detector 504 may detect text in the image. In some embodiments, the text detector 504 may detect characters; in some embodiments, the text detector 504 may detect words; in some embodiments, the text detector 504 may detect characters and words. The text detector 504 may determine bounding boxes around detected text. Each bounding box may include four coordinates that represent the detected text's location on an image. In examples, the coordinates for an example bounding box may be $X_1$, $X_2$, $Y_1$, and $Y_2$. In examples, $X_1$ and $X_2$ may be first and second horizontal offsets, respectively, from an origin point. In examples, $Y_1$ and $Y_2$ may be first and second vertical offsets, respectively, from an origin point. In some embodiments, the origin point is the top-left corner of the image. In some embodiments, each of the bounding boxes may also be associated with a confidence score determined by the text detector 504. In some embodiments, the text detector 504 may detect all text present in an image, irrespective of whether the text is part of a data table.

The text detector 504 may, in some embodiments, include an ensemble of machine learning models and may also include other components. In the example shown, the text detector 504 includes a first text detection model 506, a second text detection model 508, and a model combination layer 510. In some embodiments, each of the text detection models 506-508 may be based on a neural network and may be configured to perform a text recognition task. In some embodiments, the first text detection model 506 may be model that is trained from scratch whereas the second text detection model 508 may be a pre-trained model that is fine-tuned with domain-specific training data (e.g., invoice or receipt data). In some embodiments, the first text detection model 506 and the second text detection model 508 may train separately and infer separately, and their outputs may be fused or combined at a model combination layer 510. In some embodiments, the first text detection model 506 and the second text detection model 508 may be trained together at least in part. An example of training one or more of the first text detection model 506 or the second text detection model 508 is illustrated and described below in connection with FIG. 10. In some embodiments, the first text detection model 506 is based at least in part on a You Only Look Once (YOLO) model. In some embodiments, the second text detection model 508 is based at least in part on a Character-Region Awareness for Text Detection (CRAFT) model.

In some embodiments, each of the models 506-508 may have different strengths. For example, one of the models of the models 506-508 may perform better at detecting single characters or special characters than the other. As another example, one of the models of the models 506-508 may be better at detecting words and spacing between words than the other model. In some embodiments, one or more of the models 506-508 may detect groups of characters based on an affinity score between characters.

The model combination layer 510 may combine the first text detection model 506 and the second text detection model 508. In some embodiments, the model combination layer 510 may receive the outputs from the models 506-508 or may be appended to final layers of the models 506-508. The model combination layer 510 may determine whether the output differs between the models 506-508. If so, the model combination layer 510 may combine (e.g., average or add) the models outputs, or the model combination layer 510 may determine whether to use the output from the first model 506 or the second model 508. In examples, the model combination layer 510 may select between the output of the first model 506 and the second model 508 based at least in part on a confidence score produced by each of the models 506-508. In some embodiments, the model combination layer 510 may select between the models 506-508 based at least in part on the models' respective strengths and/or historical accuracy, and the text for which there is a discrepancy in model output. In some embodiments, the model combination layer 510 may not be appended to final layers of the models 506-508 but rather may be added to one or more middle layers or beginning layers of the model 506 or 508.

The text recognition model 512 may be a machine learning model that recognizes text in the input 502. For example, the text recognition model 512 may infer what the characters or words are in an incoming image. In some embodiments, the text recognition model 512 may recognize the text present in the bounding boxes detected by the text detector 504. In some embodiments, the text recognition model 512 may include a plurality of components. For example, the text recognition model 512 may include a component for generating feature maps and a component for predicting words. In an example, the text recognition model 512 may use a network based on ResNet to generate feature maps, and the text recognition model 512 may use an LSTM network to predict words. In some embodiments, the text recognition model 512 may use a Connectionist temporal classification (CTC) as an output and loss. For example, an LSTM network may feed forward to a CTC loss. In some embodiments, the text recognition model 512 may implement EasyOCR.

In some embodiments, the optical character recognition service 406 may include a decoder 514. In some embodiments, the decoder 514 may receive as input a final layer of the text recognition model 512, and the decoder 514 may, based on data in the final layer determine the characters or words predicted by the text recognition model 512. In some embodiments, greedy decoder or beam search is used as the decoder 514. In some embodiments, other techniques or processes may be used.

In some embodiments, the optical character recognition service 406 may include a post-processing unit 516. The post-processing unit 516 may perform one or more operations on the recognized text. For example, the post-processing unit 516 may correct spelling or perform other operations.

In the example shown, the optical character recognition service 406 may provide the output 518 to another component of the data extraction service. The output 518 may include a plurality of bounding boxes. Each of the bounding boxes may include a set of coordinates and a confidence score. Furthermore, each of the bounding boxes may include or be associated with text, which may have been inferred by the text recognition model 512. In some embodiments, the optical character recognition service 406 may also output other data.

Figure 6:
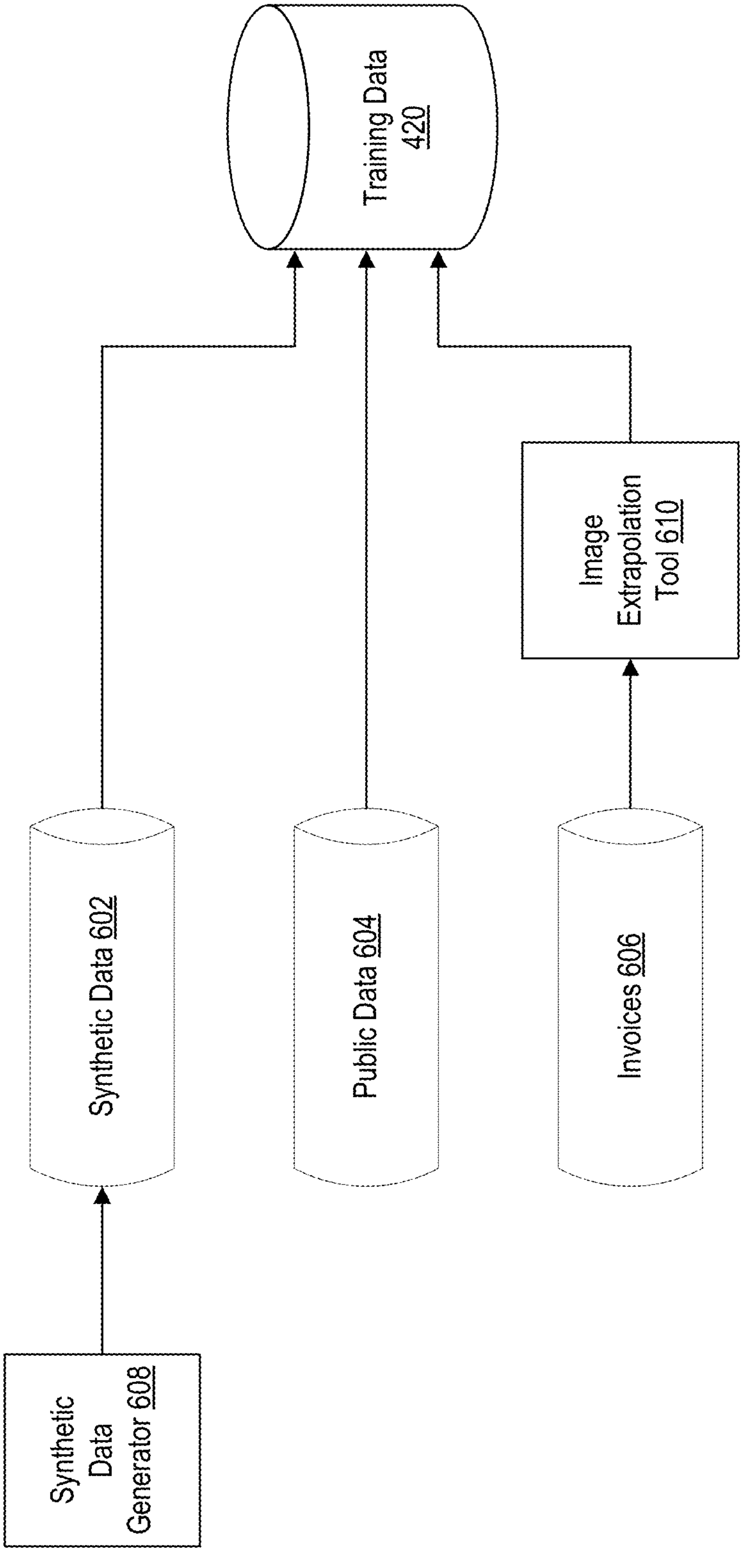
FIG. 6 illustrates a block diagram of example training data.

FIG. 6 illustrates a schematic block diagram of training data 420) that comprises various sets of data. In the example shown, the training data 420 includes synthetic data 602, public data 604, and invoices 606. As discussed above in connection with FIG. 4, the training data 420 may be used to train the labeling model 408 or one or more of the models of the character recognition service 406.

The synthetic data 602 may be data that is created to train a model. In examples, the synthetic data 602 may include a plurality of training instances. In the example shown, the synthetic data 602 may be generated created by a synthetic data generator 608. The synthetic data generator 608 may be a person or program that creates training data. In some embodiments, the synthetic data generator 608 may include one or more of a text recognition data generator or OpenCV. In some embodiments, the synthetic data 602 may include data in a tabular form. In some embodiments, the synthetic data generator 608 may iteratively generate training data according to a performance of a models. For example, if a model needs more training for a particular type of data, then the synthetic data generator 608 may generate training instances for that type of data. In some embodiments, the synthetic data generator 608 may generate training instances having varying font types, font sizes, font styles (e.g., bold, italic, underlines, small caps, strikethrough text, subscripts, superscripts, etc.), background colors, and lines. The training instances may also have other miscellaneous data, such as barcodes, logos, or handwritten markup. In some embodiments, the synthetic data generator 608 may use backgrounds cropped from images of actual invoices.

The public data 604 may include data sets that are publicly available. In some embodiments, the public data 604 may be open-source data. Examples of public data 604 may include the FUNSD (Form Understanding in Noisy Scanned Documents) or FUNSD+ dataset. Public data 604 may also include data that may be scraped form the internet.

The invoices 606 may include a plurality of images of invoices received or generated by an organization. In some embodiments, one or more of the invoices 606 may be annotated. In some embodiments, the annotation of the invoices may be used as labels for a labeled training set. In examples, a human may provide the labels. In some embodiments, the labels may include the location of text and a truth value for the text (e.g., the actual characters or symbols of the text). In some embodiments, the labels may correspond to a classification of the text. For example, a label may indicate that text is a column header or field, table data, a header, a question, an answer, or another classification. In some embodiments, the invoices 606 may be sufficiently different from one another to improve generalizability of the models.

It is noted that the invoices 606 may include invoices that are organized into different formats. For example different ones of the invoices may have different layouts or locations at which particular tabular data may be located or organized.

The image extrapolation tool 610 may use the invoices 606 to generate additional training instances. For a plurality of invoices of the invoices 606, the image extrapolation tool 610 may perform one or more operations on the image to generate variations of the image, thereby creating more training instances, which may, in some instances, be annotated and labeled. As an example, the image extrapolation tool 610 may change a background color or shading of an image. Additionally, the image extrapolation tool 610 may perform other operations such as changing a brightness, contrast, color saturation, or other image characteristic.

Figure 7:
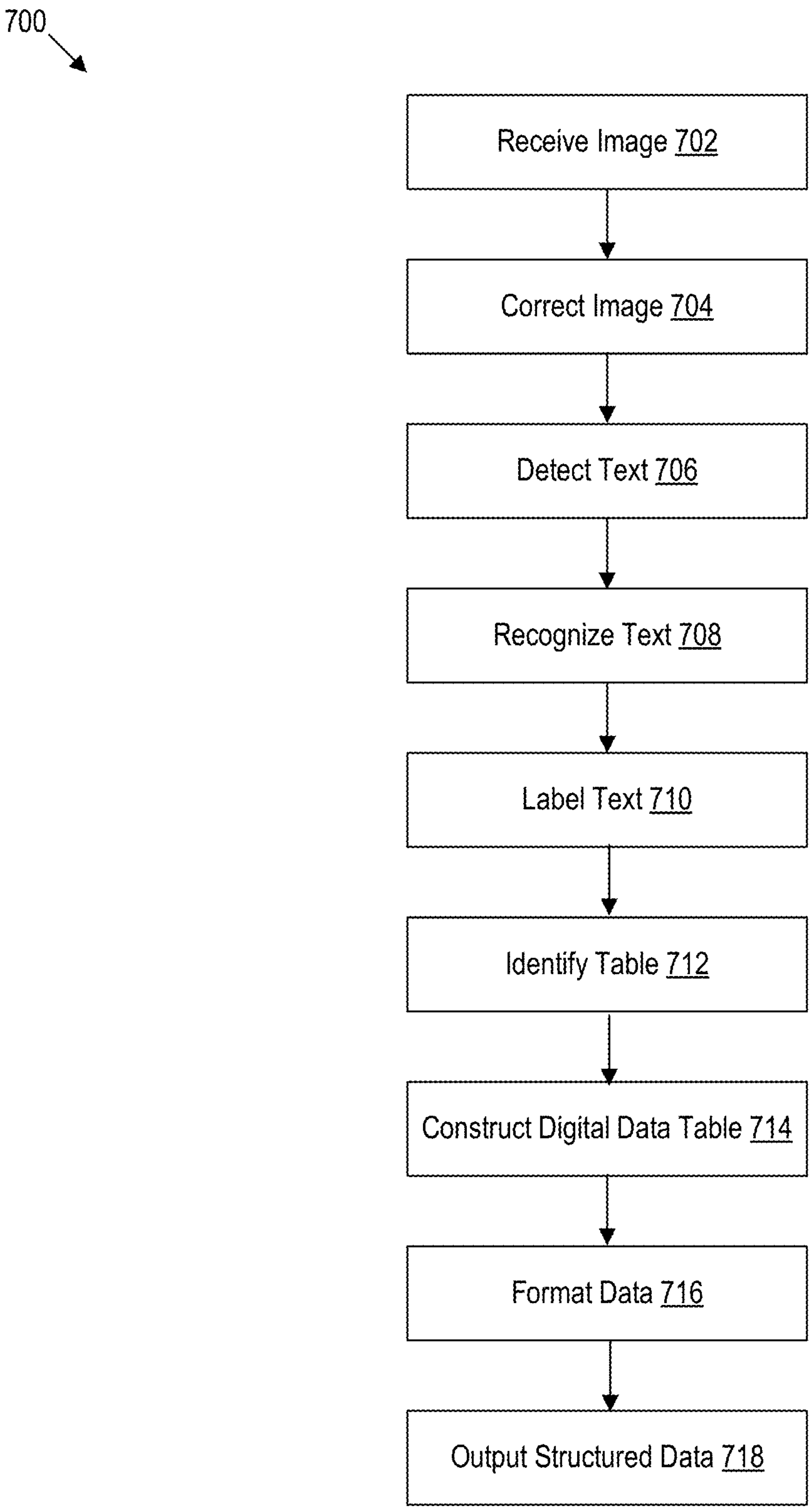
FIG. 7 is a flowchart of a method that may be executed by the data extraction service.

FIG. 7 is a flowchart of an example method 700 for extracting structured data from an image. In some embodiments, the data extraction service 102 may perform aspects of the method 700. In some embodiments, components of the data extraction service 102 described above in connection with FIG. 4 may perform one or more of the illustrated operations.

In the example shown, the data extraction service 102 may receive an image (step 702). For example, the data extraction service 102 may receive an image of data, such as data in a tabular form. In examples, the image may include an invoice. In some embodiments, the data extraction service 102 may use the image intake system 402 to receive the image. In some embodiments, the data extraction service 102 may receive the image from a device or program that calls an API exposed by the data extraction service 102. As part of receiving an image, the data extraction service 102 may also perform other operations, such as authenticating the sender or the image, or logging a receipt of the image.

In the example shown, the data extraction service 102 may correct the image (step 704). For example, the data extraction service 102 may apply the image correction system 404 to the image so that the image may be more accurately processed by other components of the data extraction service 102. As described above, the image correction system 404 may pre-process the image by performing one or more processes on the image, including, but not limited to, the following: deskewing, dewarping, despeckling, binarization, correcting light or shading, changing image from horizontal to vertical or vice-versa, or performing another operation on the image. In some embodiments, the data extraction service 102 may also reject the image and request that a user recapture the image if the image cannot be processed by the data extraction service 102.

In the example shown, the data extraction service 102 may detect text in the image (step 706). For example, the data extraction service 102 may apply the text detector 504, or aspects of the text detector 504, to detect text in the image. As a result, the data extraction service 102 may determine locations of a plurality of bounding boxes including text. As described above in connection with FIG. 5, the data extraction service 102 may, in some embodiments, apply an ensemble of machine learning models to detect text in the image.

In the example shown, the data extraction service 102 may recognize text in the image (step 708). For example, the data extraction service 102 may apply the text recognition model 512 to recognize text in the image. In some embodiments, the data extraction service 102 may recognize text for each of the bounding boxes determined by the text detection model.

Figure 8:
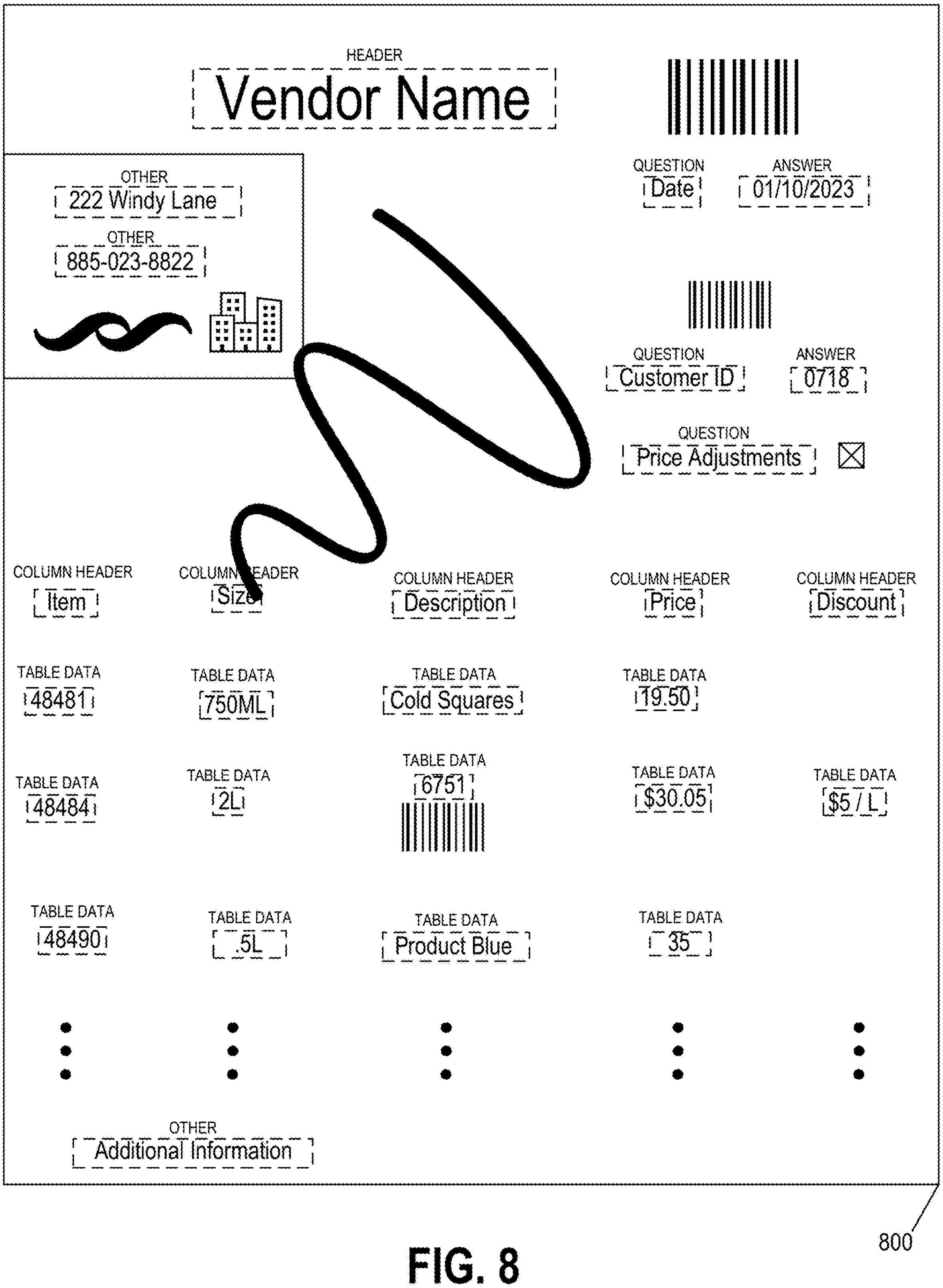
FIG. 8 illustrates a schematic representation of an image of an invoice.

In the example shown, the data extraction service 102 may label text in the image (step 710). For example, the data extraction service 102 may apply the labeling model 408 to the image. In examples, the data extraction service 102 may label text as table column headers or as table data. In some embodiments, data in the bounding boxes labeled data table column headers or table data may be part of a data table being extracted by the data extraction service 102. In some embodiments, the labels may also include other classifications, such as header, question and answer, or other. An example of an invoice labeled with classifications is illustrated in FIG. 8.

In the example shown, the data extraction service 102 may identify a table in the image (step 712). To do so, the data extraction service 102 may determine text and coordinates for table column headers. For example, the data extraction service 102 may determine which bounding boxes correspond to column headers. To do so, the data extraction service 102 may select the bounding boxes labeled by the labeling model 408 as table column headers.

In some embodiments, the data extraction service 102 may determine that other bounding boxes are also column headers. To do so, the data extraction service 102 may, for example, fit a horizontal line through a vertical midpoint of each of the plurality of bounding boxes labeled as table column headers. The data extraction service 102 may select, as a column header, each bounding box through which the horizontal line passes, thereby including, in some instances, bounding boxes that may not have been labeled by the labeling model 408 as table column headers but which may nevertheless be column headers based on their alignment with bounding boxes that were labeled as table column headers. In some embodiments, the data extraction service 102 may append such boxes to a list of boxes labeled as column headers. In some embodiments, the data extraction service 102 may select, as column headers, bounding boxes that fall within a band of the horizontal line.

In addition to identifying table column headers, the data extraction service 102 may also identify bounding boxes that are part of the tabular data. For example, the data extraction service 102 may select the bounding boxes labeled as tabular data and create a list of such bounding boxes. Furthermore, in some embodiments, the data extraction service 102 may select additional bounding boxes to include to the list of tabular data. To do so, the data extraction service 102 may select bounding boxes that are in a similar horizontal or vertical position of bounding boxes labeled as tabular data. For example, similar to the process for determining additional column headers, the data extraction service 102 may determine lines through midpoints of bounding boxes labeled as table data and select bounding boxes that intersect with—or come within a band of—these lines. In some embodiments, the data extraction service 102, having identified the table, may have generated a list of bounding boxes that correspond to column headers and a list of bounding boxes that correspond to tabular data, e.g., classified according to the column headers.

In the example shown, the data extraction service 102 may construct a digital data table that corresponds with a data table depicted in the image (step 714). To do so, the data extraction service 102 may, in some embodiments, apply the table extractor 410, which is further described above in connection with FIG. 4. In some embodiments, the data extraction service 102 may use the column header list of bounding boxes and the tabular data list of bounding boxes to construct the digital data table. An example method for constructing the digital data table is illustrated and described below in connection with FIG. 9. As a result of constructing the digital data table, the data extraction service 102 may determine a 2-D array, or other data structure, having values that represent the rows and columns of the data table in the image.

In the example shown, the data extraction service 102 may format the data (step 716). For example, the data extraction service 102 may format the 2-D array into a data object or file that may be used by a downstream service, a process that is further described above in connection with FIGS. 1 and 4. As an example, the data extraction service 102 may format the data as a JSON or DataFrame object. In some embodiments, the data extraction service 102 may perform additional operations to the data before outputting it, such as, for example, performing spell check or other operations on text in the table, adding metadata to the data, associating the data with authentication or security data, or performing other operations.

In the example shown, the data extraction service 102 may output structured data (step 718). For example, the data extraction service 102 may output the structured data 114. For example, the data extraction service 102 may output a digital data table to one or more of the downstream entities 106*a-d*.

FIG. 8 illustrates an example image of an invoice 800. In some embodiments, the invoice 800 represents an invoice after a labeling model has inferred a classification of bounding boxes identified in an image the invoice 800. In the example shown, the invoice 800 is sent from a vendor to a customer. The invoice 800 includes a vendor name, contact information (e.g., address and phone number), a date, a customer ID field, a price adjustment field, a data table including column headers and tabular data, other information, and miscellaneous marks, such as barcodes, logos, and other markings (e.g., a wavy mark). The invoice 800 also includes a data table. However, there may not be lines in the table, there may not be a clear indication of where the table starts or stops, the table may include miscellaneous markings, one or more data cells in the data table may be empty, or the columns or rows may not be perfectly aligned, among other possible challenges.

In the example shown, the invoice 800 includes bounding boxes illustrated by the dashed boxes. In some embodiments, the data extraction service 102 may determine the bounding boxes using an optical character recognition service 406 (e.g., at the steps 706-708 of the method 700). Though not illustrated, each of the bounding boxes may be associated with a set of coordinates. In examples, the data extraction service 102 may also determine a string for each of the bounding boxes (e.g., a string consisting of the characters or number in the bounding box). In some embodiments, the data extraction service 102 may provide an image of the invoice 800 and the bounding boxes (e.g., the bounding box coordinates and strings) to the labeling model. In examples, the inputs may be converted into embeddings.

In some embodiments, the labeling model may then label one or more of the bounding boxes. In the example of FIG. 8, five labels are shown: HEADER, QUESTION, ANSWER, COLUMN HEADER, TABLE DATA, and OTHER. For instance, the labeling model may have been trained to identify these categories. HEADER may correspond to a title or sender of the invoice; QUESTION may be one or more words that seek general information about the invoice, such as date, total amounts, total discount, customer ID, or other information; ANSWER may be one or more words that respond to a QUESTION; COLUMN HEADER may be one or more words corresponding to a column header of a data table; TABLE DATA may be one or more words, data, or markings that correspond to table data; OTHER may be bounding boxes corresponding to other data. In some embodiments, once the data extraction service 102 has determined bounding labels, the data extraction service 102 may construct a digital data table corresponding to the data table in the invoice 800.

Figure 9:
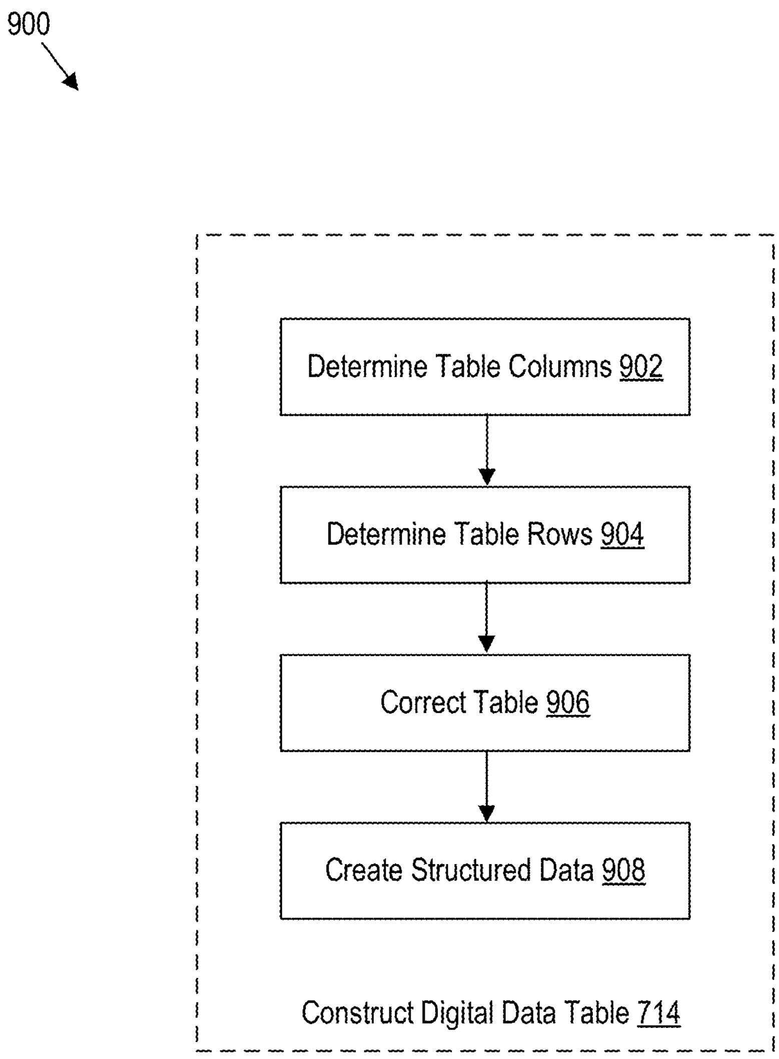
FIG. 9 is a flowchart of a method that may be used to construct a digital data table.

FIG. 9 is a flowchart of an example method 900 for performing at least some aspects of constructing a digital data table, the step 714 of the method 700. In some embodiments, aspects of the method 900 may be performed by the data extraction service 102 or a component of the data extraction service 102, such as the table extractor 410. To construct the digital data table, the data extraction service 102 may apply a dynamic text box reference algorithm that uses, as input, the list of bounding boxes determined to be column headers and the list of bounding boxes determined to be table data, as described, for example, in connection with the step 712 of the method 700.

In the example shown, the data extraction service 102 may determine table columns (step 902). To do so, the data extraction service 102 may, in some embodiments, select a bounding box labeled as a table column header, and the data extraction service 102 may set this bounding box as a reference box. Next, the data extraction service 102 may search the bounding boxes labeled as table data for a bounding box that is below and adjacent to the reference box. To do so, the data extraction service 102 may use the coordinates of the bounding boxes. The data extraction service 102 may label this bounding box as a target bounding box. To determine whether the target bounding box belongs to the same column as the reference bounding box, the data extraction service 102 may, in some embodiments, check two conditions. First, the data extraction service 102 may determine whether a center point of the target bounding box is between the $X_1$ and $X_2$ coordinates of the reference bounding box. Second, the data extraction service 102 may determine whether a horizontal line area of the target bounding box is sufficiently below a horizontal line area of the reference bounding box. For example, given a width of the reference bounding box, the data extraction service 102 may determine whether the horizontal line area (e.g., a top or middle of the bounding box) is at least 0.8% distance away. If both conditions are met, then the data extraction service 102 may add the target bounding box to a list or dictionary that represents the column. Furthermore, the data extraction service 102 may set the target bounding box as the reference text box and search for a further bounding box below the new target bounding box.

In some embodiments, the data extraction service 102 may continue this process until there are not more bounding boxes below a newly set reference bounding box. Then the data extraction service 102 may begin the process again by using a different bounding box labeled as a table column header. Once the data extraction service 102 has looped over each of the bounding boxes in a list of table column headers, the result may be a set of table columns (e.g., a set of lists, arrays, or dictionaries) that represent columns in the data table. In some embodiments, by creating a column by moving from one box to the next, and by dynamically checking whether a target box belongs to a same column as a reference box—and then making the target bounding box the reference bounding box for a following iteration—the data extraction service 102 may correctly create table columns even if there are no lines present in the image and even if the image is curved or skewed. Yet still, the data extraction service 102 may handle other situations, such as when a data cell includes text on two different lines, and the data extraction service 102 may accurately keep such cell data together.

In the example shown, the data extraction service 102 may determine table rows (step 904). As a result, the data extraction service 102 may generate a data structure that represents the full table. The data extraction service 102 may, in some embodiments, use the columns generated in step 902 to determine table rows. In some embodiments, the data extraction service 102 may sort the table columns by a column text box $X_1$ coordinate. After sorting, the data extraction service 102 may still need to determine the row to which a data value belongs. To do so, the data extraction service 102 may, in some embodiments, determine whether a data value belongs in a same row as previous values belonging to the row. The data extraction service 102 may use coordinates of a bounding box for a data value. For example, the data extraction service 102 may determine whether a vertical alignment (e.g., Y value) of a bounding box, or of one or more coordinates of a target bounding box, falls within a vertical range defined by coordinates of previous bounding boxes in the row. If so, the target bounding box may be included in the row, and coordinates of a following target bounding box may be checked.

In the example shown, the data extraction service 102 may correct the table (step 906). For example, the data extraction service 102 may determine whether there are rows or columns that are empty or have null values. If so, the data extraction service 102 may, in some instances, remove such rows or columns. Additionally, in some embodiments, the data extraction service 102 may remove a row or column if the number of zero or null values in the row or column is above a threshold value (e.g., 20%, 50%, or another value). In some embodiments, the data extraction service 102 may verify that data values have an expected format. For example, the data extraction service 102 may verify that values in a "Quantity" column include numbers, that values in an "ID" column have an expected ID format, or that values in a "Date" column have a valid date format. In some embodiments, the data extraction service 102 may check that values have an expected format while performing the operations 902-906.

In the example shown, the data extraction service 102 may create structured data (step 908). For example, the data extraction service 102 may combine other data generated during execution of the method 900. In some embodiments, the data extraction service 102 may format the digital data table into an object or file that may be used by a downstream entity, such as JSON or DataFrame object that includes the digital data table.

Figure 10:
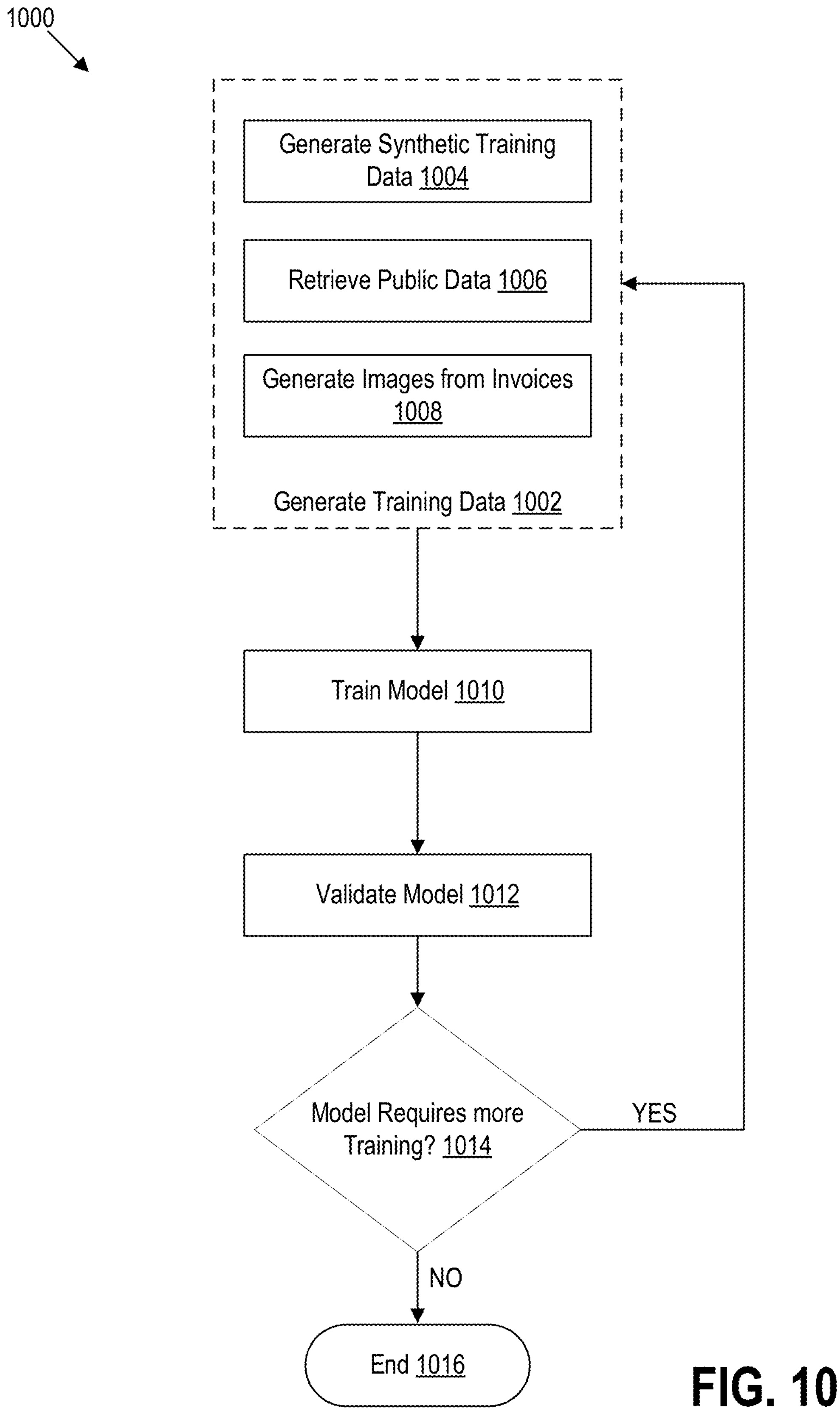
FIG. 10 is a flowchart of a method for training a model.
Figure 11:
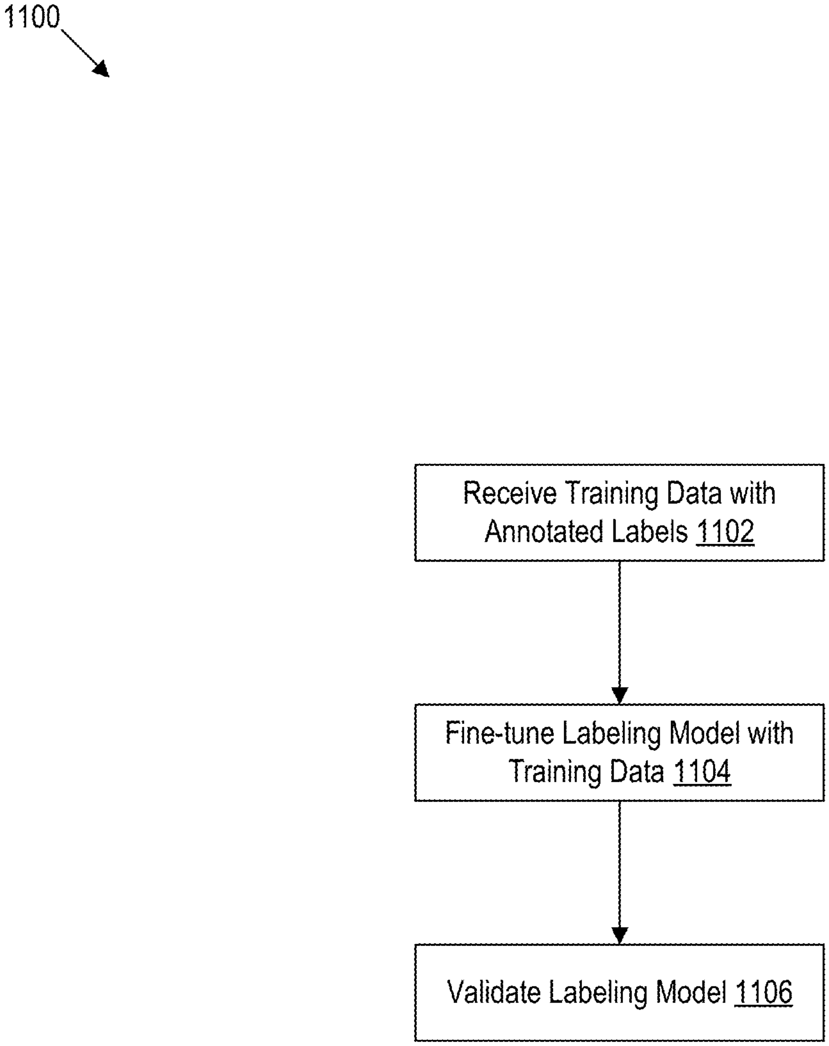
FIG. 11 is a flowchart of a method for training a model.

FIGS. 10-11 illustrate example methods that may be used to train models of the data extraction service 102. In some embodiments, the training handler 418 or another component of the data extraction service 102 may perform aspects of the methods 1000 or 1100 to train one or more of the models. In some embodiments, a person or component that is not part of the data extraction service 102 may perform aspects of the methods 1000 and 1100. In an example, the method 1000 may be used to train models of the optical character recognition service 406, and the method 1100 may be used to train the labeling model 408. However, in some embodiments, aspects of the method 1000 may be used to train the labeling model 408 and aspects of the method 1100 may be used to train one or more models of the optical character recognition service 406.

FIG. 10 is a flowchart of an example method 1000 that may be used to train a machine learning model. In describing operations of the method 1000, the data extraction service 102 is described as training a single model. As described above in connection with FIG. 5, however, the optical character recognition service 406 may include a plurality of machine learning models (e.g., the first text detection model 506, the second text detection model 508, and the text recognition model 512). In some embodiments, the data extraction service 102 may perform aspects of the method 1000 multiple times. For example, the data extraction service 102 may apply the method 1000 for each of the models of the optical character recognition service 406. In some embodiments, the data extraction service 102 may use aspects of the method 1000 to train one or more of the models of the optical character recognition service 406 together.

In the example shown, the data extraction service 102 may generate training data (step 1002). In examples, the training data used by the data extraction service 102 in the execution of the method 1000 may include the training data 420. In some embodiments, generating training data may include various subprocesses, such as generating synthetic training data (step 1004), retrieving public data (step 1006), and generating images from invoices (step 1008). In some applications of the method 1000, generating training data will include more or fewer subprocesses than those illustrated in the example of FIG. 10. In some embodiments, the data extraction service 102 may apply the synthetic data generator 608 to generate synthetic data, examples of which are described above as synthetic data 602 in connection with FIG. 6. In some embodiments, retrieving public data may include accessing one or more publicly available databases or other sources to retrieve publicly available training data. Example public data is described above as public data 604 in connection with FIG. 6. Generating images from invoices may include accessing invoices and applying the image extrapolation tool 610, as described above, for example, in connection with FIG. 6.

In some embodiments, the training data used by the data extraction service 102 may vary depending on the model for which the training data is used. For instance, in some embodiments, certain data sets may be used to train a text recognition model that are not used to train a text detection model, or vice-versa. For example, at least some of the generated synthetic data may be used to train one or more models of the text detector 504 and may not be used to train the text recognition model 512, or vice-versa.

In the example shown, the data extraction service 102 may train the model (step 1010). For example, the data extraction service 102 may use at least some of the data generated during the step 1002 to train the model. For some models, the data extraction service 102 may train the model from scratch. For some models, the data extraction service 102 may fine-tune one or more layers of the layer while leaving other layers frozen or partially frozen. When fine-tuning, the data extraction service 102 may, in some embodiments, add a layer to one or more of a beginning, middle, or end of a pre-trained model. The loss function used during model training may depend on the task for which the model is being trained.

In the example shown, the data extraction service 102 may validate the model (step 1012). For example, the data extraction service 102 may perform tests on the model. In some embodiments, the data extraction service 102 may withhold at least some of the training data so that it may be used to validate the model. In some embodiments, validating the model may include testing the model using images that the model did not use for training. In some embodiments, the data extraction service 102 may determine performance metrics of the model as part of validating the model. For example, the data extraction service 102 may determine one or more of a precision, recall, F1 score, of mean average precision (mAP) score.

In the example shown, the data extraction service 102 may determine whether the model requires additional training (decision 1014). For example, the data extraction service 102 may determine, based on performance metrics determined while validating the model, whether the model requires additional training. In some embodiments, whether the model requires more training may depend on whether the one or more performance metrics are above a threshold (e.g., having at least 90%, or another percentage, for one or more of an accuracy, precision, F1 score, or mAP score). In some embodiments, the data extraction service 102 may evaluate whether the model is performing sufficiently well for a certain subset of data (e.g., images having certain characteristics, such as a certain background color, data table structure, or other characteristic). In response to determining that the model requires more training, the data extraction service 102 may generate more training data, thereby returning to the step 1002 (e.g., taking the "YES" branch). In some embodiments, the data extraction service 102 may return to the step 1010 instead of the step 1002. In response to determining that the model does not require more training, the data extraction service 102 may end (step 1016) the method 1000 (e.g., taking the "NO" branch). In some embodiments, by determining whether to continue training the model, the data extraction service 102 may iteratively train the model, ensuring, in some embodiments, that a threshold performance is reached and assuring that the model performs well for various types of data.

FIG. 11 is a flowchart of an example method 1100 for training the labeling model 408. In the example shown, the data extraction service 102 may receive training data with annotated labels (step 1102). For example, the data extraction service 102 may receive a plurality of invoices, and the data of the invoices may be labeled. As an example, the data extraction service 102 may receive labels for data or bounding boxes of the invoice. The labels may, in some embodiments, denote a category to which a word or group of words belongs, such as the categories illustrated in connection with the example invoice 800 of FIG. 8. In some embodiments, the training data may include at least some of the training data of the training data 420. In some embodiments, the training data may include one or more training instances from the FUNSD or FUNSD+ dataset. In some embodiments, the training data may include data that was edited by a user that received data from the data extraction service 102.

In the example shown, the data extraction service 102 may fine-tune the labeling model using the training data with annotated labels (step 1104). For example, the data extraction service 102 may fine-tune the labeling model 408 of FIG. 4. For instance, the labeling model 408 may be based on a pre-trained visual language model, and in some embodiments, the pre-trained visual language model may not be trained to perform any particular task or may not be trained for a particular domain. In some embodiments, the data extraction service 102 may fine-tune the pre-trained visual language model by adding one or more layers to a beginning, middle, or end of the model. Then the data extraction service 102 may train the updated model, thereby altering weights or other parameters of the added layers. As a result, the model may be configured to perform a particular visual language task (e.g., classifying text in an image), understand data from a particular domain (e.g., invoices), or both. In some embodiments, when fine-tuning the model, one or more layers of the pre-trained model may be frozen.

In the example shown, the data extraction service 102 may validate the labeling model (1106). For example, the data extraction service 102 may test the labeling model and determine one or more performance metrics of the labeling model. In examples, the data extraction service 102 may use one or more operations described above in connection with the step 912 of FIG. 9. Although not illustrated in the example of FIG. 9, the data extraction service 102 may iteratively train the labeling model. For example, the data extraction service 102 may further train the labeling model in response to receiving more training data or determining that a performance metric of the labeling model is below a threshold value (e.g., 90% or another value).

Figure 12:
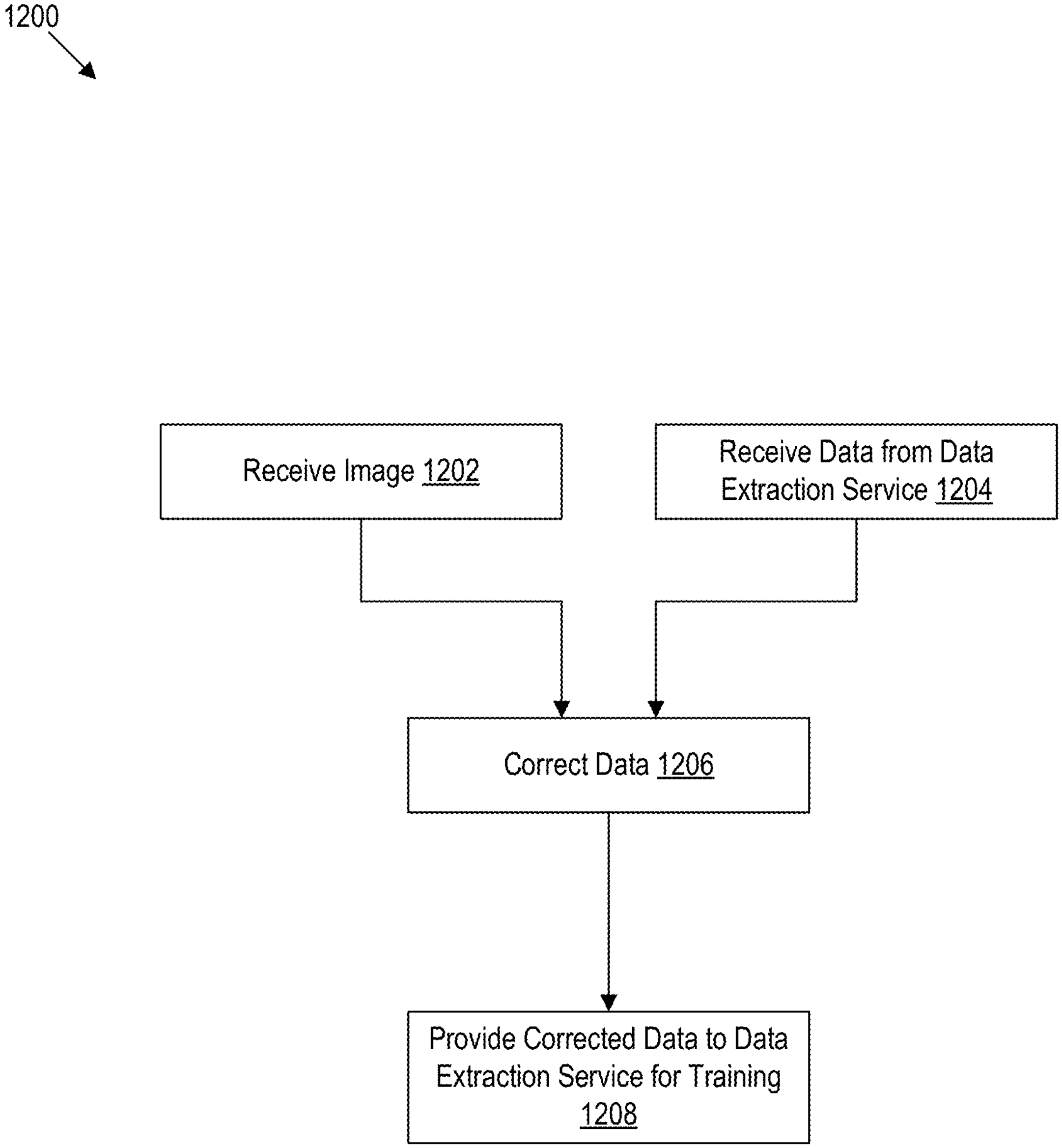
FIG. 12 is a flowchart of a method for correcting data and generating training data.

FIG. 12 is a flowchart of a method 1200 that may be used to generate training data. In some embodiments, aspects of the method 1200 may be performed by an entity that receives a digital data table from the data extraction service 102. For example, aspects of the method 1200 may be performed by one or more of the downstream entities 106*a-d*, such as a user associated with a system that is responsible for processing invoice data or receiving a shipment of goods associated with an invoice. The method 1200 is described as being performed by such a user; however, in some embodiments, aspects of the method 1200 may be performed by another person or system.

In the example shown, the user may receive an image (step 1202). In some embodiments, the image may be the same image 112 that may be received and processed by the data extraction service 102. In some embodiments, the image may be of an invoice.

In the example shown, the user may receive structured digital table data from the data extraction service 102 (step 1204). In some embodiments, the structured data may be the structured data 114 output by the data extraction service. In some embodiments, the user may view the structured data in the form of a table by using a computer that can interpret and render a data structure or file format of the structured data.

In the example shown, the user may correct the data (1206). For example, the user may compare a data table in the image with the data table received by the data extraction service 102. In some embodiments, if the data extraction service 102 did not make any errors when extracting the data table, then data of the digital data table may match the data table in the image, and the user may not make any corrections. However, in some instances, the user may notice a discrepancy between the table in the image and the structured digital data table. For example, one or more values may be different, a value may be erroneously missing or present, or an alignment of the digital table may be different than an alignment of a data table in the image. In some embodiments, the user may correct the digital data table to match a data table in the image. In some embodiments, the user may create a new digital table corresponding to the data table in the image. Furthermore, in some embodiments, the user may alter a label of digital data table, such as one or more of the labels inferred by the labeling model 408.

In the example shown, the user may provide the corrected data to the data extraction service 102 for training (step 1208). In some embodiments, the corrected data may be part of the training data 420. In some embodiments, the data extraction service 102 may then use the edited data to further train one or more machine learning models. For example, the data edited by the user to match a data table depicted in the image may be used by the data extraction service 102 as ground truths for an additional training instance that includes the image.

Figure 13:
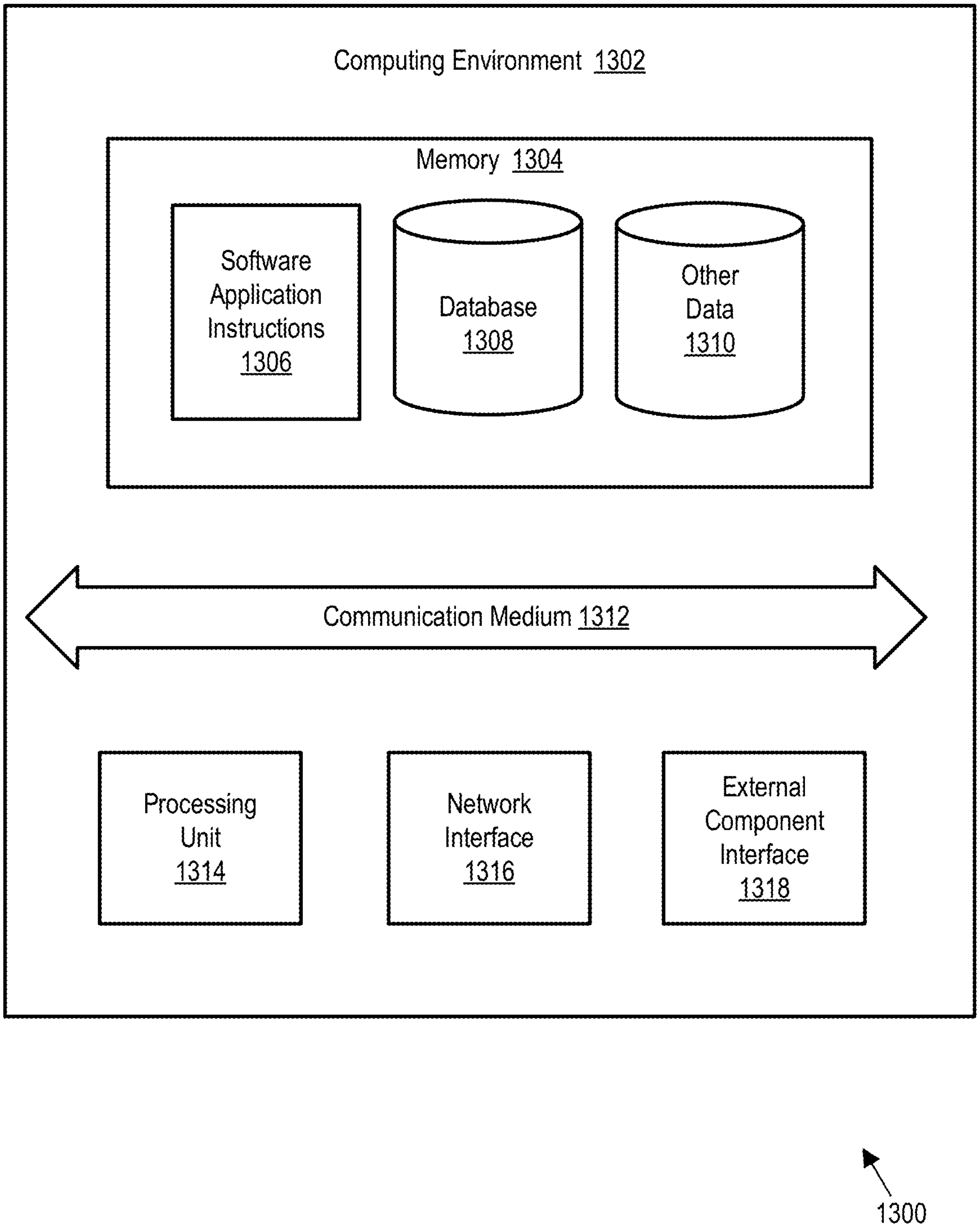
FIG. 13 illustrates a block diagram of an example computing system.

FIG. 13 illustrates an example system 1300 with which disclosed systems and methods can be used. In an example, the following can be implemented in one or more systems 1200 or in one or more systems having one or more components of system 1300: the data extraction service 102, the device 104, downstream entities 106*a-d*, training data 108, pre-trained models 110, image intake system 402, image correction system 404, optical character recognition service 406, labeling model 408, table extractor 410, data formatter 412, structured data output system 414, model training system 416, training handler 418, training data 420, text detector 504, first text detection model 506, second text detection model 508, model combination layer 510, text recognition model 512, decoder 514, post-processing unit 516, synthetic data 602, public data 604, invoices 606, synthetic data generator 608, image extrapolation tool 610, training data 420, and other aspects of the present disclosure.

In an example, the system 1300 can include a computing environment 1302. The computing environment 1302 can be a physical computing environment, a virtualized computing environment, or a combination thereof. The computing environment 1302 can include memory 1304, a communication medium 1312, one or more processing units 1314, a network interface 1316, and an external component interface 1318.

The memory 1304 can include a computer readable storage medium. The computer storage medium can be a device or article of manufacture that stores data and/or computer-executable instructions. The memory 1304 can include volatile and nonvolatile, transitory and non-transitory, removable and non-removable devices or articles of manufacture implemented in any method or technology for storage of information, such as computer readable instructions, data structures, program modules, or other data. By way of example, and not limitation, computer storage media may include dynamic random access memory (DRAM), double data rate synchronous dynamic random access memory (DDR SDRAM), reduced latency DRAM, DDR2 SDRAM, DDR3 SDRAM, solid state memory, read-only memory (ROM), electrically-erasable programmable ROM, optical discs (e.g., CD-ROMs, DVDs, etc.), magnetic disks (e.g., hard disks, floppy disks, etc.), magnetic tapes, and other types of devices and/or articles of manufacture that store data.

The memory 1304 can store various types of data and software. For example, as illustrated, the memory 1304 includes software application instructions 1306, one or more databases 1308, as well as other data 1310. The communication medium 1312 can facilitate communication among the components of the computing environment 1302. In an example, the communication medium 1312 can facilitate communication among the memory 1304, the one or more processing units 1314, the network interface 1316, and the external component interface 1318. The communications medium 1312 can be implemented in a variety of ways, including but not limited to a PCI bus, a PCI express bus accelerated graphics port (AGP) bus, a serial Advanced Technology Attachment (ATA) interconnect, a parallel ATA interconnect, a Fiber Channel interconnect, a USB bus, a Small Computing system interface (SCSI) interface, or another type of communications medium.

The one or more processing units 1314 can include physical or virtual units that selectively execute software instructions, such as the software application instructions 1306. In an example, the one or more processing units 1314 can be physical products comprising one or more integrated circuits. The one or more processing units 1314 can be implemented as one or more processing cores. In another example, one or more processing units 1314 are implemented as one or more separate microprocessors. In yet another example embodiment, the one or more processing units 1314 can include an application-specific integrated circuit (ASIC) that provides specific functionality. In yet another example, the one or more processing units 1314 provide specific functionality by using an ASIC and by executing computer-executable instructions.

The network interface 1316 enables the computing environment 1302 to send and receive data from a communication network. The network interface 1316 can be implemented as an Ethernet interface, a token-ring network interface, a fiber optic network interface, a wireless network interface (e.g., Wi-Fi), a Bluetooth interface, or another type of network interface.

The external component interface 1318 enables the computing environment 1302 to communicate with external devices. For example, the external component interface 1318 can be a USB interface, Thunderbolt interface, a Lightning interface, a serial port interface, a parallel port interface, a PS/2 interface, or another type of interface that enables the computing environment 1302 to communicate with external devices. In various embodiments, the external component interface 1318 enables the computing environment 1302 to communicate with various external components, such as external storage devices, input devices, speakers, modems, media player docks, other computing devices, scanners, digital cameras, and fingerprint readers.

Although illustrated as being components of a single computing environment 1302, the components of the computing environment 1302 can be spread across multiple computing environments 1302. For example, one or more of instructions or data stored on the memory 1304 may be stored partially or entirely in a separate computing environment 1302 that is accessed over a network. Depending on the size and scale of the computing environment 1302, it may be advantageous to include one or more load balancers to balance traffic across multiple physical or virtual machine nodes. Each node may be configured to be capable of running the full system 1300, such that portal can run and schedule jobs and serve the portal user interface as long as a single node remains functional. The environment 1302 may include monitoring technology to determine when a node is not functioning so an appropriate action can be taken.

While particular uses of the technology have been illustrated and discussed above, the disclosed technology can be used with a variety of data structures and processes in accordance with many examples of the technology. The above discussion is not meant to suggest that the disclosed technology is only suitable for implementation with the data structures shown and described above.

This disclosure described some aspects of the present technology with reference to the accompanying drawings, in which only some of the possible aspects were shown. Other aspects can, however, be embodied in many different forms and should not be construed as limited to the aspects set forth herein. Rather, these aspects were provided so that this disclosure was thorough and complete and fully conveyed the scope of the possible aspects to those skilled in the art.

As should be appreciated, the various aspects (e.g., operations, memory arrangements, etc.) described with respect to the figures herein are not intended to limit the technology to the particular aspects described. Accordingly, additional configurations can be used to practice the technology herein and/or some aspects described can be excluded without departing from the methods and systems disclosed herein.

Similarly, where operations of a process are disclosed, those operations are described for purposes of illustrating the present technology and are not intended to limit the disclosure to a particular sequence of operations. For example, the operations can be performed in differing order, two or more operations can be performed concurrently, additional operations can be performed, and disclosed operations can be excluded without departing from the present disclosure. Further, each operation can be accomplished via one or more sub-operations. The disclosed processes can be repeated.

Although specific aspects were described herein, the scope of the technology is not limited to those specific aspects. One skilled in the art will recognize other aspects or improvements that are within the scope of the present technology. Therefore, the specific structure, acts, or media are disclosed only as illustrative aspects. The scope of the technology is defined by the following claims and any equivalents therein.

The invention claimed is:

1. A method for extracting data from an image, the method comprising:

receiving the image, the image depicting a data table;

performing optical character recognition on the image to identify a plurality of bounding boxes and to determine one or more characters associated with each bounding box of the plurality of bounding boxes, wherein performing optical character recognition comprises:

applying an ensemble of machine learning text detection models to identify the plurality of bounding boxes by determining coordinates for each bounding box, the ensemble of machine learning text detection models comprising:

a first text detection model configured to detect characters; and a second text detection model configured to detect groups of characters; and applying a machine learning text recognition model to identify the one or more characters associated with each bounding box of the plurality of bounding boxes;

labeling, using a multi-modal machine learning model trained to perform a classification task, a first bounding box of the plurality of bounding boxes as a column header and a second bounding box of the plurality of bounding boxes as including tabular data; and constructing, based at least in part on the labels of the first bounding box and the second bounding box, a digital data table corresponding to the data table.

2. The method of claim 1, further comprising labeling a first plurality of bounding boxes of the plurality of bounding boxes as column headers and a second plurality of bounding boxes of the plurality of bounding boxes as tabular data; and wherein constructing the digital data table corresponding to the data table is performed based at least in part on the labels of the first plurality of bounding boxes and the second plurality of bounding boxes.

3. The method of claim 1, wherein constructing the digital data table corresponding to the data table is performed based at least in part on the coordinates of at least the first bounding box and the second bounding box.

4. The method of claim 1, further comprising generating embeddings for coordinates of the plurality of bounding boxes, the one or more characters associated with each bounding box of the plurality of bounding boxes, and the image;

wherein labeling, using the multi-modal machine learning model trained to perform the classification task, the first bounding box of the plurality of bounding boxes as a column header and the second bounding box of the plurality of bounding boxes as tabular data comprises inputting the embeddings into the multi-modal model.

5. The method of claim 1, wherein the image is an image of an invoice.

6. The method of claim 1, wherein the image is received from a mobile device having a camera.

7. The method of claim 1, wherein performing optical character recognition on the image to identify the plurality of bounding boxes and to determine the one or more characters associated with each bounding box of the plurality of bounding boxes further comprises applying a model combination layer, wherein the model combination layer selects an output based on outputs of the first and second text detection models.

8. The method of claim 1, wherein the second text detection model detects groups of characters based on a plurality of affinity scores between characters;

wherein the first text detection model is trained from scratch; and wherein the second text detection model is a pre-trained text detection model fine-tuned to detect invoice text.

9. The method of claim 1, wherein the multi-modal model is a pre-trained visual language model that is fine-tuned to perform the classification task on an invoice.

10. The method of claim 1, further comprising providing the digital data table to an accounts payable system and to a mobile device.

11. The method of claim 1, further comprising:

providing the digital data table to a user;

receiving, from the user, corrected data; and training, using the corrected data and the image, one or more of the plurality of machine learning models or the multi-modal machine learning model.

12. The method of claim 1, further comprising:

generating synthetic training data;

receiving annotated training data;

receiving public training data;

altering one or more of the synthetic training data, the annotated training data, or the public training data to create additional training data; and prior to performing optical character recognition, training the plurality of machine learning models using the synthetic training data, the annotated training data, the public training data, and the additional training data.

13. The method of claim 1, wherein constructing, based at least in part on the labels of the first bounding box and the second bounding box, the digital data table comprises:

determining a plurality of table columns using on one or more bounding boxes labeled as column headers;

aligning the plurality of table columns using coordinates of bounding boxes labeled as column headers; and for each bounding box labeled as tabular data, matching, based on the coordinates of the bounding box, the bounding box with a table column of the plurality of table columns.

14. The method of claim 1, wherein a template for the data table is not used when labeling, using the multi-modal machine learning model trained to perform the classification task, the first bounding box of the plurality of bounding boxes as a column header and the second bounding box of the plurality of bounding boxes as tabular data; and wherein the template for the data table is not used when constructing, based at least in part on the labels of the first bounding box and second bounding box, the digital data table.

15. The method of claim 1, wherein the data table does not include lines between at least some of the tabular data.

16. A data extraction service comprising:

a processor; and memory storing instructions that, when executed by the processor, causes the data extraction service to:

receive an image depicting a data table;

perform optical character recognition on the image to identify a plurality of bounding boxes and to determine one or more characters associated with each bounding box of the plurality of bounding boxes, wherein performing optical character recognition comprises applying a plurality of machine learning models, the plurality of machine learning models comprising a first text detection model, a second text detection model, and a text recognition model;

label, using a multi-modal machine learning model trained to perform a classification task, a first bounding box of the plurality of bounding boxes as including a column header and a second bounding box of the plurality of bounding boxes as including tabular data; and construct, based at least in part on the labels of the first bounding box and the second bounding box, a digital data table corresponding to the data table.

17. The data extraction service of claim 16, wherein the image is a computer-generated invoice.

18. The data extraction service of claim 16, wherein constructing the digital data table corresponding to the data table is performed based at least in part on coordinates of at least the first bounding box and the second bounding box.

19. A system for converting a data table into a digital data table, the system comprising:

a device;

a downstream entity; and a data extraction service communicatively coupled to the device and the downstream entity;

wherein the data extraction service is configured to:

receive an image from the device, the image depicting the data table;

perform optical character recognition on the image to identify a plurality of bounding boxes and to determine one or more characters associated with each bounding box of the plurality of bounding boxes, wherein performing optical character recognition comprises applying a plurality of machine learning models;

label, using a multi-modal machine learning model trained to perform a classification task, a first bounding box of the plurality of bounding boxes as a column header and a second bounding box of the plurality of bounding boxes as including tabular data;

construct, based at least in part on the labels of the first bounding box and the second bounding box, the digital data table corresponding to the data table; and provide the digital data table to the downstream entity.

20. The system of claim 19, wherein the device is a mobile phone with a camera;

wherein the data table includes data for an invoice or a receipt; and wherein the downstream entity is configured to receive the digital data table and compare data of the digital data table to data associated with a shipment of goods.

* * * * *